United States Patent [19]

McLagan et al.

[11] Patent Number: 4,930,065
[45] Date of Patent: May 29, 1990

[54] AUTOMATIC DATA CHANNELS FOR A COMPUTER SYSTEM

[75] Inventors: Angus McLagan, Newport Beach; Gei-Jon Pao, Garden Grove; Chong S. Un, Anaheim, all of Calif.; John J. Pearce, Jr., Del Valle, Tex.

[73] Assignee: David Computer Corporation, Irvine, Calif.

[21] Appl. No.: 397,645

[22] Filed: Aug. 21, 1989

Related U.S. Application Data

[63] Continuation of Ser. No. 088,617, Aug. 20, 1987, abandoned.

[51] Int. Cl.$^5$ .......................... G06F 9/00; G06F 9/22
[52] U.S. Cl. ................................ 364/200; 364/262.4; 364/262.8
[58] Field of Search .................... 364/200, 364/900

[56] References Cited

U.S. PATENT DOCUMENTS

| | | | |
|---|---|---|---|
| 3,688,274 | 8/1972 | Cormier et al. | 364/200 |
| 3,771,136 | 11/1973 | Heneghan et al. | 364/200 |
| 4,148,098 | 4/1979 | McCreight et al. | 364/200 |
| 4,410,941 | 10/1983 | Barrow et al. | 364/200 |
| 4,439,829 | 3/1984 | Tsiang | 364/200 |

OTHER PUBLICATIONS

"Naked Mini 16, Engineering Specification", Computer Automation, Inc., document No. 00-98017-00, Apr. 14, 1971.
"Declaration of David H. Methvin".

Primary Examiner—Gary V. Harkcom
Assistant Examiner—Michael A. Jaffe
Attorney, Agent, or Firm—Knobbe, Martens, Olson & Bear

[57] ABSTRACT

A data communications system for a computer for transferring data between the memory of the computer and one or more peripheral devices without requiring an interrupt context switch. The data communications system includes a number of specialized registers in the central processing unit of a computer, a computer memory, a data storage location associated with one or more peripheral devices, and a bus connecting the data storage location to the memory. The specialized registers in the central processing unit are dedicated exclusively to processing data transfers between the memory and the data storage location associated with the peripheral devices. Data transfers between the computer memory and the data storage location associated with the peripheral devices are made under the control of the central processing unit with the use of the special registers without the execution of an interrupt context switch.

21 Claims, 12 Drawing Sheets

AUTOMATIC DATA CHANNELS FOR A COMPUTER SYSTEM

This application is a continuation of application Ser. No. 088,617, filed 8/20/87, now abandoned.

BACKGROUND OF THE INVENTION

This invention relates to a central processor-controlled, interrupt-driven data communications system for transferring data between a computer and various peripheral devices in which no interrupt context switch is required. The invention also relates to a central processor-controlled, interrupt-driven data communications system in a computer in which data can be continuously written into or read from noncontiguous pages of memory space without causing an interrupt context switch.

In a typical central processor-controlled data communications system within a computer, the central processing unit of the computer controls data communications between the memory of the computer and a plurality of input/output (I/O) devices such as printers, keyboards, other computers, etc. This central processor-controlled system is in contrast to other non-central processor-controlled communications systems in which a plurality of processors jointly control data communications between I/O devices and the memory of the computer. An example of such a non-central processor-controlled system is direct-memory access. In direct-memory access (DMA), a plurality of DMA processors each associated with a respective I/O device compete with the central processing unit of the computer for access to the memory to transfer data between I/O devices and the memory of the computer. This type of DMA system is essentially a network in which each of the DMA processors and the central processing unit of the computer can independently obtain use of the memory bus. In the type of system of the present invention, only the central processing unit can obtain control of bus to read from or write to the memory. Any I/O devices needing to access the memory must transmit an interrupt to the central processing unit. The CPU will then stop what it is doing and will execute the memory transfer requested by the I/O device. Thus, in this central processor-controlled system, only the central processing unit has direct access to the memory, and the I/O devices do not.

In the operation of a typical central processor-controlled system in a computer, in order to access the memory of the computer, an I/O device must generate an interrupt, which is an electronic signal that is transmitted to the central processing unit and causes it to temporarily halt the operation on which it is working and execute the memory transfer requested by the I/O device. Interrupts, which are well-known and used universally in computer systems, cause the central processing unit of the computer to perform an "interrupt context switch."

An interrupt context switch is the saving to memory of the general purpose registers of the computer so that the general purpose registers may be used by the computer program which performs the memory transfer. A typical computer has a single bank of general purpose registers which are used by a number of various computer programs being executed by the computer. When an interrupt is generated, the computer saves the contents of the register bank to memory so that interrupt service routine can use the general purpose registers. After the interrupt service routine is finished being executed, the original contents of the register bank are retrieved from memory and restored so that the original program can begin to be executed where it left off without losing any of its data. This saving to memory and the subsequent retrieval of general purpose registers is referred to as an "interrupt context switch" for the purposes of this specification.

When an interrupt is generated in a typical prior art computer, the contents of the general purpose registers are saved to the memory. Next, the interrupt service routine associated with the interrupt is performed. There are typically a number of different interrupt service routines within a computer, each being associated with a different type of interrupt. Each interrupt typically includes an address that tells the central processing unit of the computer where to find the correct interrupt service routine associated with the particular interrupt generated. The interrupt service routine, which is typically a computer program, is executed and performs the task requested by the interrupt. During its execution, the interrupt service routine uses the general purpose registers whose contents were previously saved to memory. After the interrupt service routine is finished being executed, the original contents of the general purpose registers are restored from memory, and the execution of the computer program that was interrupted by the interrupt resumes.

It is undesirable to perform an interrupt context switch each time an interrupt is generated because of the time required to save the contents of all of the general purpose registers to memory. The time required to transfer data between a register in the central processing unit and the memory of a computer is relatively long, usually taking on the order of five times as long as a data transfer between two registers in the central processing unit. The time required for typical state-of-the-art computers today to execute an interrupt context switch and the associated interrupt service routine is approximately 100-140 microseconds. As a result, the execution of an interrupt context switch each time an interrupt is generated can critically affect the performance of a computer, especially in data communications, in which a great number of interrupts are required by a computer needing to handle a relatively large number of data transfers between its memory and peripheral devices. In these days of dramatically increased data communications, many computers are brought to their knees due to the need to perform an interrupt context switch each time an interrupt is generated.

One approach to eliminating the problem of performing an interrupt context switch each time an interrupt is generated involved using a number of memory locations for the storage of information relating to the interrupt generated. In this approach, when an interrupt was generated, the interrupt would provide the central processing unit of the computer with an address specifying a memory location. The memory location contained a particular input or output instruction, which would then be executed by the central processing unit to accomplish the task requested by the interrupt. Thus, the input or output instruction was analogous to an interrupt service routine. The memory of the computer included many memory locations, each of which was associated with a respective interrupt, and each of the memory locations stored the input or output instruction that would properly service its associated interrupt.

While this approach obviated the need to perform an interrupt context switch, the memory still needed to be accessed in order to fetch the input and output instructions that were to be executed by the central processing unit to service the interrupts. Although this approach resulted in better computer performance over the typical approaches which executed interrupt context switches, the relatively long memory access times required to fetch the input and output instructions in this approach unduly hindered the performance of the computer.

The memory of a computer is typically divided into "pages," each page of the memory consisting of the same number of memory locations, for example, 1000 memory locations. Thus, a computer may have a memory consisting of 1000 pages of memory, each page having 1000 memory locations, for one megabyte of total memory storage. Due to the longer access times required for memory, data is typically transferred to or from the memory a page at a time instead of a memory location at a time.

Before a data file is transferred into the memory of a typical prior art computer, the computer first finds an empty memory page into which the data can be transferred. This is accomplished by accessing an available page table. Such a table includes the memory addresses of all memory pages that are not currently being used to store data. The computer accesses the available page table to retrieve the memory address of an empty memory page, and then uses that address to access the memory and store the data file into the empty memory page.

In order to retrieve data, a reverse process is used. Before a data file can be retrieved from memory, the computer must first determine where that file was stored in memory. This is accomplished by accessing an existing file table, which includes a list of all the data files currently being stored by the memory and their addresses. The computer searches the existing file table for the desired file, and then retrieves the memory address where the file is stored.

Two factors complicate this process of storing and retrieving data files from memory. First, many data files are longer than a single memory page, and they may require many memory pages to be completely stored. Second, in order to utilize the memory as fully as possible, a data file may be split up and stored in a number of noncontiguous portions of memory, each portion consisting of one or more memory pages. For example, a data file that is ten memory pages long may have its first portion consisting of three pages of data stored at memory locations 2000–5000, its second portion consisting of four pages of data stored at memory locations 9000–13,000, and its final three pages of data stored at memory locations 15,000–18,000.

This ability of a computer to write a data file to a plurality of noncontiguous blocks of memory is referred to as "scatter-write," and the ability to read a data file from noncontiguous blocks of memory is referred to as "gather-read." In order to facilitate multi-page data files, a typical available page table groups together contiguous available memory pages under a single address. As a result, a multi-page data file may be stored in memory by accessing the available page table only once if there is a contiguous block of memory available that is at least as large as the data file to be stored. If the data file is required to be stored in two noncontiguous blocks of memory, then the available page table must be accessed twice. If the data file is required to be stored in three noncontiguous blocks of memory, then the available page table must be accessed three times, and so on.

In the scatter-write method in a typical prior art computer, when a data file needs to be written to the memory, an interrupt is generated and an interrupt context switch performed, and then the available page table is accessed a first time in order to retrieve the address of the first data block available in the memory. After the first portion of the data file is transferred to the memory, another interrupt is generated and the associated interrupt context switch performed, and the available page table is accessed again to get the address of the next available block of memory. This process continues until the data file has been completely written to the memory. Since an interrupt context switch is performed each time that the available page table is accessed, the associated time required for processing the interrupt hinders the performance of the computer, especially when intensive data communications are involved.

In the typical gather-read method of retrieving a data file from memory, the existing file table may have several addresses associated with a single data file. Each of the addresses specifies a particular noncontiguous memory block. In order to retrieve a file, an interrupt is generated and the existing file table is accessed to retrieve the memory address of the first portion of the data file to be retrieved. After that portion is retrieved, another interrupt is generated and the existing file table is accessed again to retrieve the memory address of the next noncontiguous portion of the memory in which the data file is stored. This process continues, an interrupt being generated each time the existing file table is accessed, until the entire data file is retrieved from memory. This method also unduly hinders the performance of the computer since an interrupt is generated each time the existing file table is accessed.

SUMMARY OF THE INVENTION

This invention solves these computer performance problems by providing a processor-controlled, interruptdriven data communications system in a computer for transferring data between the memory of the computer and one or more peripheral devices without causing an interrupt context switch.

An important feature of the invention is the use of special registers in the central processing unit (CPU) of the computer that are dedicated exclusively to servicing requests for data transfers between the memory of the computer and one or more data storage locations associated with one or more peripheral devices. These special registers allow data transfer requests to be serviced at extremely fast rates, without the performance of an interrupt context switch. As a result, the performance of a computer in which the invention is embodied is outstanding in applications intensive in data communications. For example, the time required for a computer in which this invention is embodied to handle a data channel request, perform the two-word transfer requested (described below), and return to normal operation is approximately 4 microseconds, a small fraction of the approximate 100–140 microseconds required by typical prior art computers which perform interrupt context switch. This extremely fast response time enables a computer in which the invention is embodied to service many more peripheral devices than could a typical prior art computer, and this invention allows a computer to be a real workhorse when it comes to data communications.

Another important feature of the invention is the capability to scatter-write and gather-read data to and from a number of noncontiguous blocks in the memory of a computer without causing an interrupt context switch each time the data transfer is switched from one of the noncontiguous blocks of memory to another of the noncontiguous memory blocks. This feature is especially advantageous where many long data files need to be transferred between the memory and one or more peripheral devices. This feature is accomplished by a number of data channel control blocks stored in the memory of the computer that are periodically loaded into the special CPU registers referenced above that are dedicated exclusively to servicing data transfer requests. Each data channel control block is associated with one noncontiguous portion of the memory, and the data channel control blocks have linked addresses which enables the CPU to automatically determine the address of the next data channel control block that needs to be loaded into the special CPU registers. As a result, the CPU can scatter-write and gather-read data to and from the memory without performing an interrupt context switch each time the boundary of a memory block is crossed.

These and other objects, features, and advantages of this invention will be apparent in view of the following detailed description of the preferred embodiment, which is explained with reference to the figures, a brief description of which is provided below.

DETAILED DESCRIPTION OF THE PREFERRED EMBODIMENT

Figure 1:
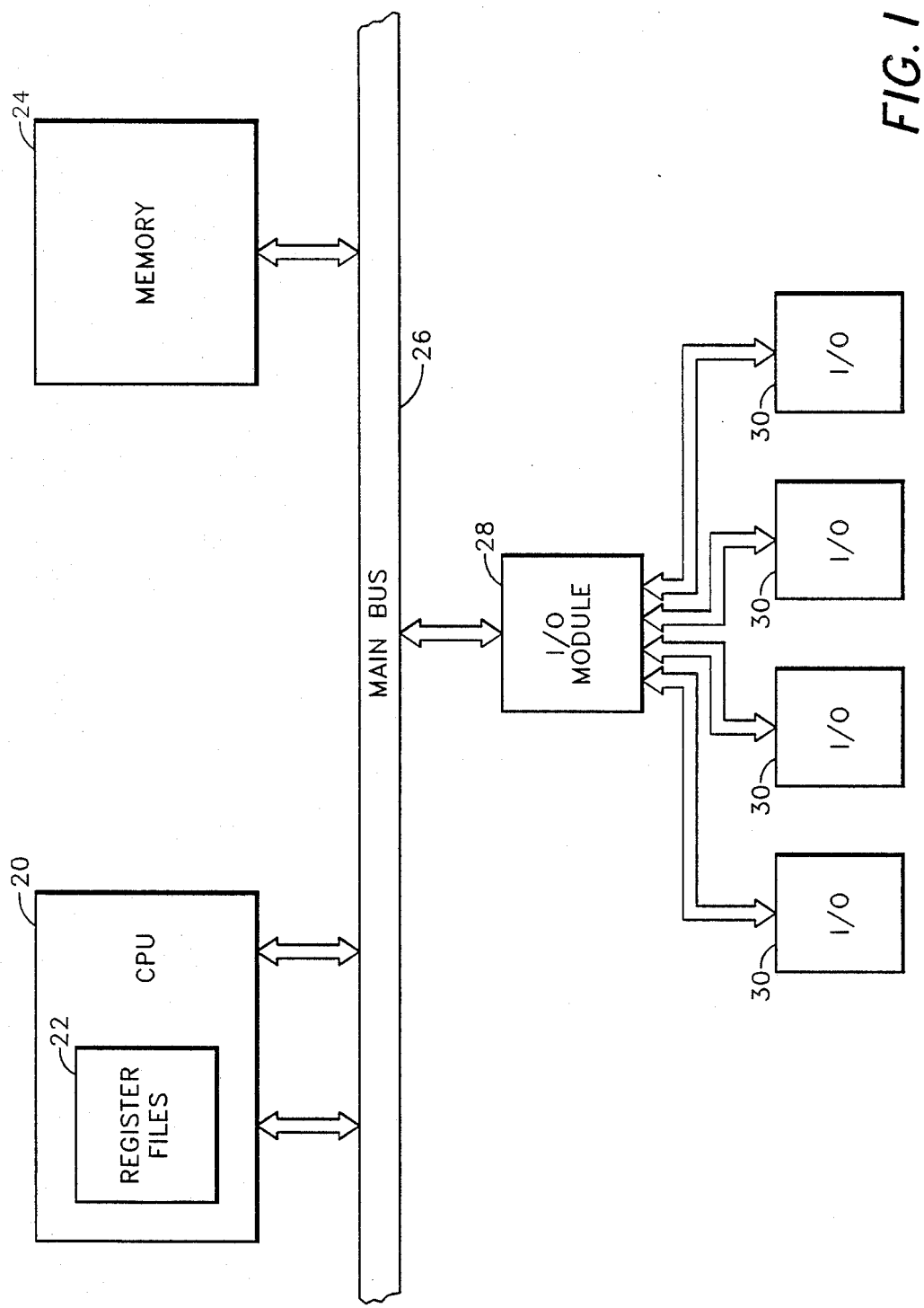
FIG. 1 is a block diagram of a preferred embodiment of a computer in accordance with the invention.

An overall block diagram of a computer incorporating a preferred embodiment of the invention is shown in FIG. 1. The computer includes a central processing unit (CPU) 20 with register files 22 and a memory 24 which are interconnected by a main bus 26. An input/output (I/O) module 28 which is connected to four input/output (I/O) devices 30 is also connected to the bus 26. Other I/O modules 28 may also be connected to the bus 26. Data is transferred between the I/O devices 30 and the memory 24 under the joint control of the I/O module 28 and the CPU 20.

Figure 2:
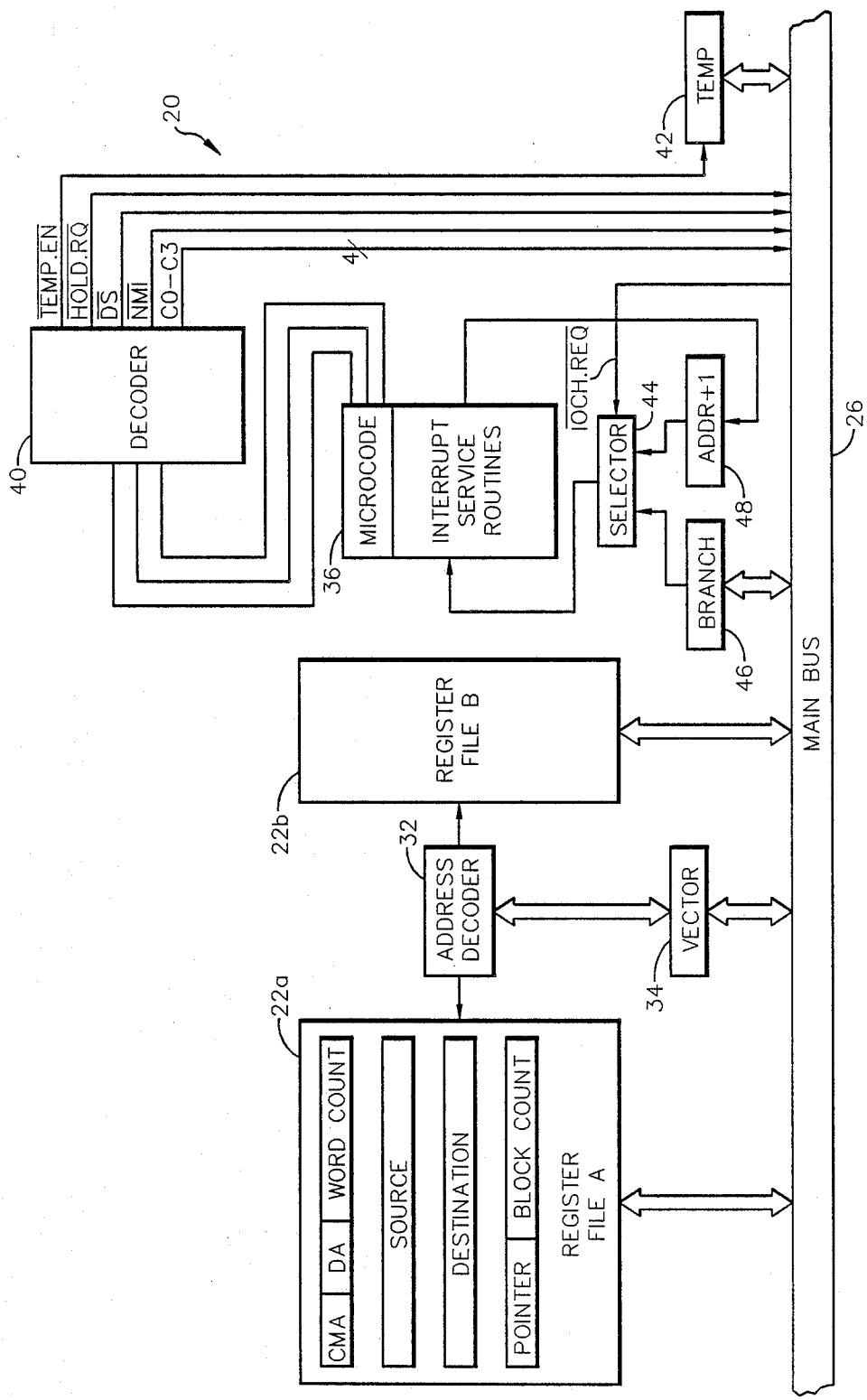
FIG. 2 is a schematic diagram of the central processing unit of the computer of FIG. 1.

The register files 22 and the CPU 20 are shown in more detail in FIG. 2. The register files 22 include an A register file 22a and a B register file 22b which are duplicates of each other. Thus, at any time the contents of the A register file 22a will be identical to the contents of the B register file 22b, and vice versa. This dual register file feature, which is not necessary to practice the invention, saves processing time of the CPU 20 because operations of the CPU can be performed in fewer clock cycles. An address decoder 32 is connected to the A register file 22a and the B register file 22b and decodes the address supplied to it by a vector register 34 to reference the desired portion of the register files 22 so that data can be written to that portion or read from that portion.

The CPU 20 includes microcode 36 that controls much of the operation of this embodiment as is described in detail below. The microcode 36 includes a number of microcoded interrupt service routines that specifically control data transfers between the I/O module 28 and the memory 24. The microcode 36 is connected to a decoder 40 that generates a number of control signals including a temporary register enable ($\overline{\text{TEMPN}}/$) signal, a hold request ($\overline{\text{HOLDQ}}/$) signal, a data strobe ($\overline{\text{DS}}$) signal, a non-maskable interrupt ($\overline{\text{NMI}}$) signal, and four control signals C0, C1, C2, and C3, all of which are explained in more detail below. The $\overline{\text{TEMPN}}/$ signal enables a temporary data register 42 that temporarily stores data that is being passed between the memory 24 and the I/O module 28 while the CPU 20 is fetching the destination address which specifies where the data that is being temporarily stored in the data register 42 is to be sent. The microcode 36 is connected to a 2:1 data selector 44 having a first input connected to receive a branch address from a branch address register 46 and a second input connected to receive an incremented address from a second address register 48. The data selector 44 is enabled by an input/output channel request ($\overline{\text{IOCHEQ}}/$) signal transmitted by the I/O module 28 when it is ready to send data to the memory 24. The branch address register 46 is connected to the main bus 26 and receives an address vector that is also transmitted by the I/O module 28. The address vector causes a particular portion of the microcode 36 to be implemented as is described below.

Figure 3:
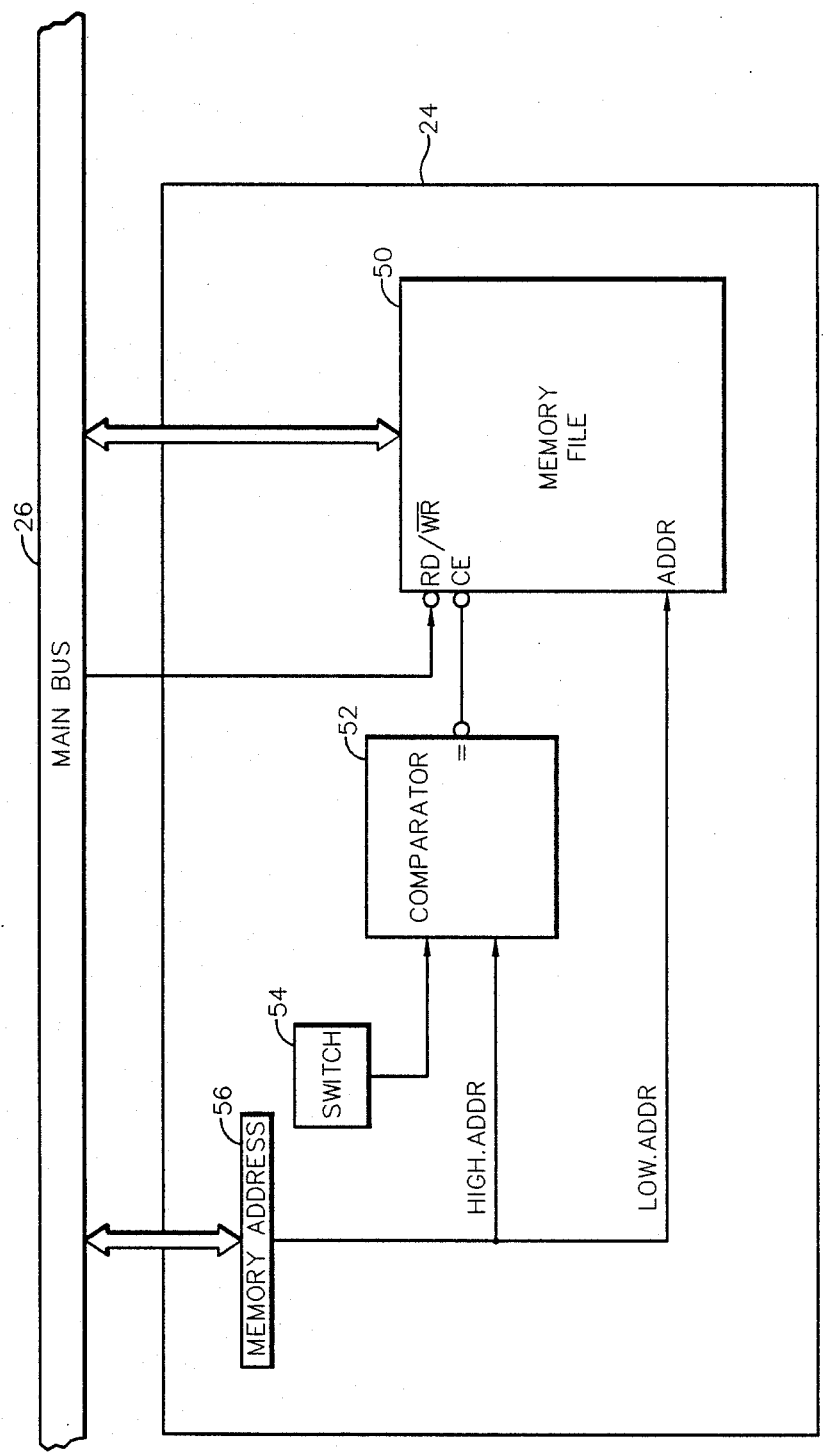
FIG. 3 is a schematic diagram of the memory of the computer of FIG. 1.

The memory 24 is shown in more detail in FIG. 3. The memory 24 includes a memory file 50 having a chip enable (CE) input, a read/write (RD/$\overline{\text{WR}}$) input, and an address (ADDR) input. The CE input is coupled to receive the output of a comparator 52 having one input connected to a programmable switch 54 and its other input connected to a multi-bit high address (HIGH.ADDR) signal transmitted by a memory address register 56. Since more than one memory file 50 may be used in the memory, the programmable switch 54 is set to a unique combination of bits to identify a particular memory file. Consequently, a particular memory file 50 is accessed only when the proper HIGH.ADDR signal is transmitted to its memory address register 56 as determined by the comparator 52. The memory address register 56 transmits a multi-bit low address (LOW- .ADDR) signal to the memory file 50 to specify which particular memory location is to be accessed.

Figure 4:
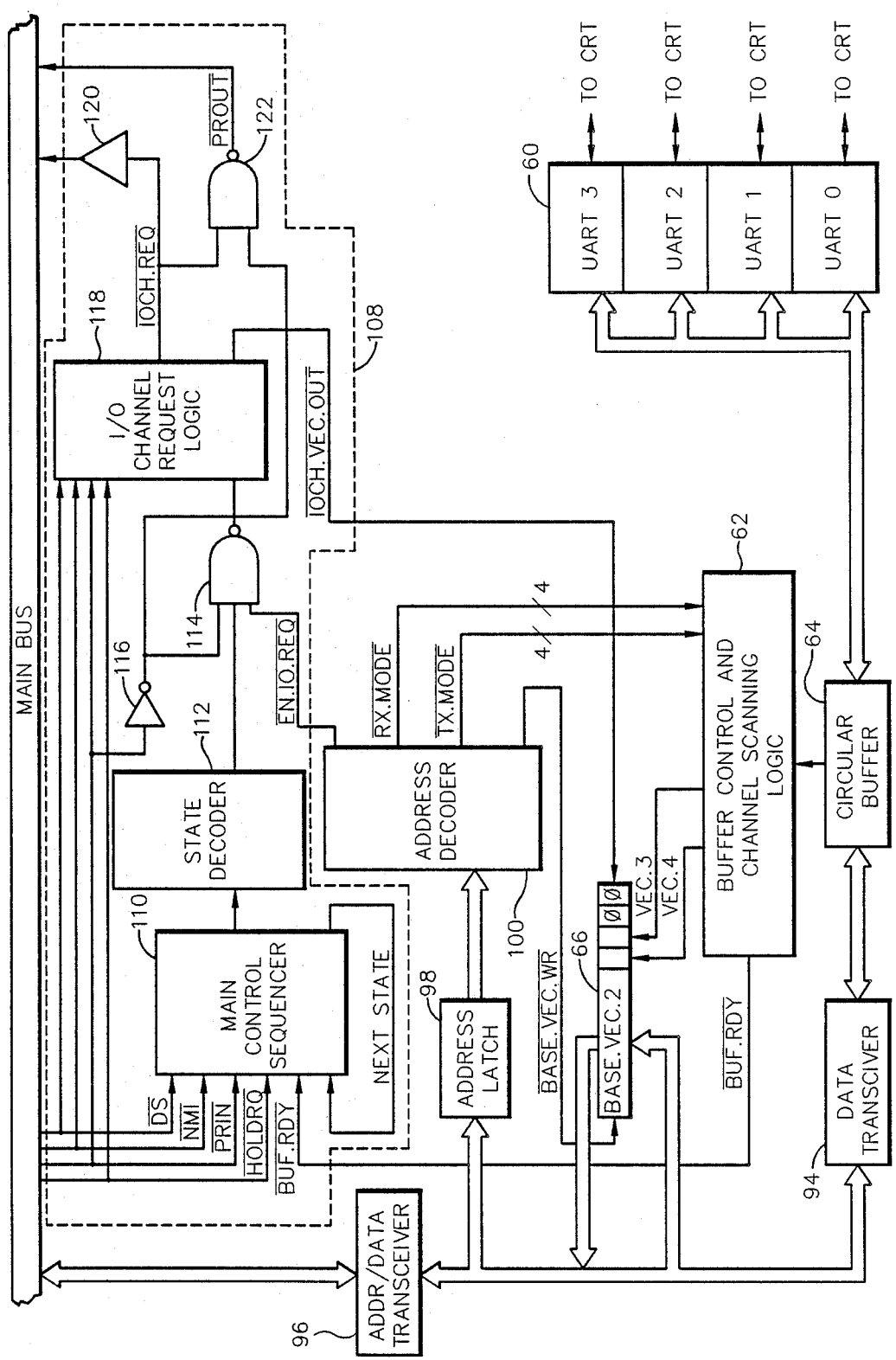
FIG. 4 is a schematic diagram of the input/output module of the computer of FIG. 1.

The I/O module 28 controls the transfer of data between the main bus 26 and the I/O devices 30 to which the I/O module 28 is connected. These I/O devices 30 may be cathode ray tubes as indicated in FIG. 4, or they may be other peripheral devices such as printers, keyboards, or even other computers. Now referring to FIG. 4, the I/O module 28 includes four universal asynchronous receiver/transmitter (UART) units 60 each of which is connected to a respective cathode ray tube (CRT) (not shown). Each of the four UARTs 60 of the I/O module 28 is of conventional, well known design and comprises 2 MAX232 transmitter/receiver integrated circuit chips commercially available from Maxim Integrated Products, Inc. of Sunnyvale, CA and a 2661 enhanced programmable communications interface integrated circuits chips commercially available from Signetics. Under the control of buffer control and channel scanning logic 62, the UARTs 60 pass data back and forth between the four CRTs and a bidirectional circular buffer 64. The circular buffer 64 is divided into four buffer sections, sections 0-3, one for each of the UARTs 60, and is of conventional, well known design, comprising 8 2016 static RAM integrated circuit chips commercially available from Motorola.

The basic function of the buffer control and channel scanning logic 62 is to sequentially enable each of the UARTs 60 so that each UART 60 may send to or receive data from the circular buffer 64. The buffer control and channel scanning logic 62 also generates a pair of single bit address signals, VEC.4 and VEC.3, that are the fourth and third least significant bits, respectively, of an address vector stored in an address vector register 66. The two least significant bits of the address vector are both zero, and the high order bits of the address vector register contain a particular base vector which points to a particular set of registers in the CPU 20. The address vector contained in the address vector register 66 is used to address particular registers in the CPU 20 which are dedicated exclusively to controlling transfers of data between the memory 24 and the I/O devices 30, and these dedicated registers are an important feature of the invention.

Figure 9:
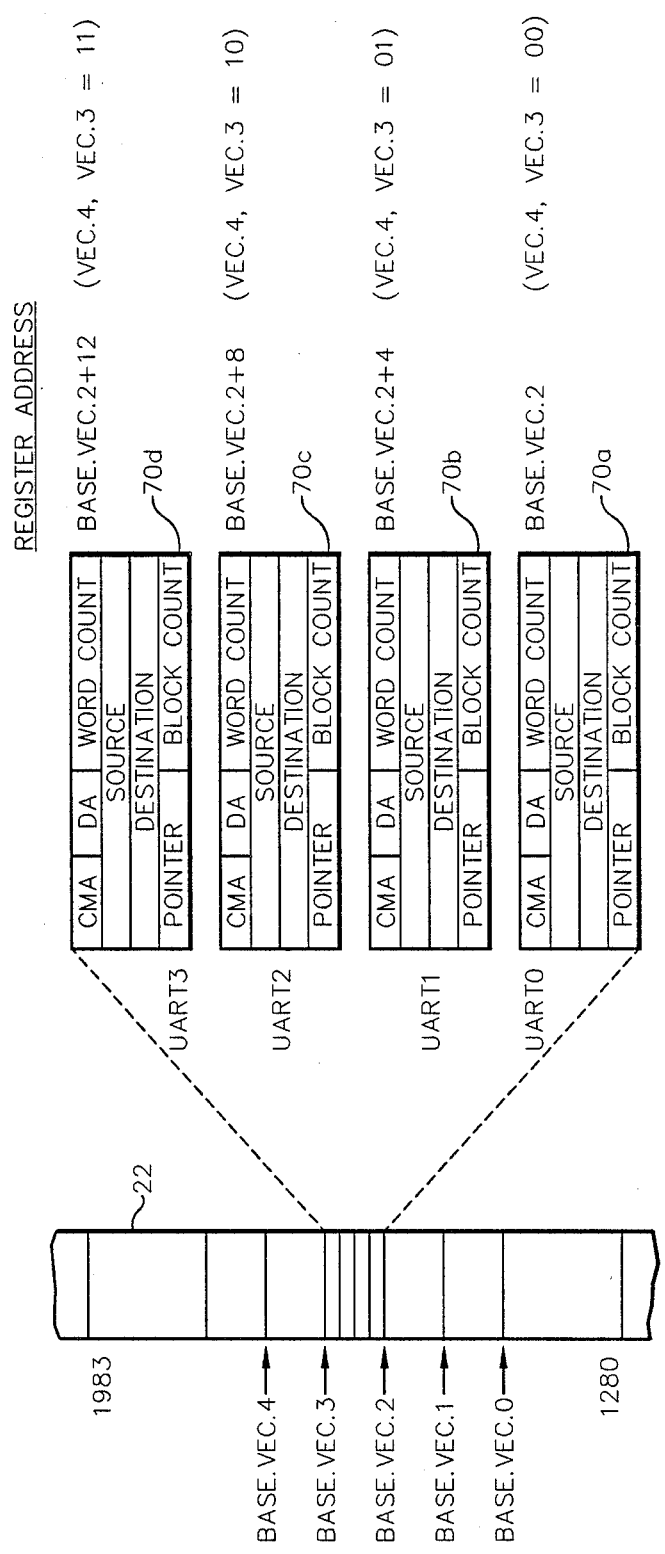
FIG. 9 is a schematic diagram of one of the register files of the computer of FIG. 1.

Now referring to FIG. 9, a portion of one of the register files 22 is shown generally on the left-hand side of the figure. This portion includes 704 registers dedicated exclusively to controlling data transfers. These 704 registers, hereinafter referred to as data channel registers, occupy address locations 1280 through 1983 and are grouped functionally in sets of four registers. The contents of four sets 70 of data channel registers are shown in detail on the right-hand side of FIG. 9. Each of the sets 70 is dedicated exclusively to one of the UARTs 60. The first register in each set is divided into three portions, a first of which contains a channel microcode address (CMA). The channel microcode address is used to invoke a particular interrupt service routine implemented in the microcode 36. The interrupt service routines generate the control signals that cause data to be transferred between the memory 24 and the UARTs 60. The next portion of the first register contains a device address (DA) that specifies which I/O module 28 is to be involved in the data transfer. The final portion of the first register contains a word count that specifies how many words are to be transferred between the memory 24 and the I/O module 28. The second register in each set of data channel registers stores a source address that specifies the particular location from which data is to be transferred. The source address will be a memory address if data is being transferred from the memory 24 to one of the UARTs 60, and it will be the address of one of the UARTs 60 if data is being transferred from a UART 60 to the memory 24. The third register in each set 70 of data channel registers contains a destination address that specifies the location to which the data is to be transferred. Like the source address, the destination address will either be a memory address or the address of one of the UARTs 60. The fourth register in each data channel register set 70 has a first portion that contains a pointer that specifies a data channel control block stored in the memory 24 as is explained in more detail below in the description of the operation of this embodiment. The fourth register also contains a block count that specifies how many blocks of data are to be transferred.

Each I/O module 28 has an associated set 70 of data channel registers in the register files 22 which is specified by its base vector. For example, on the lefthand side of FIG. 9, a plurality of base vectors BASE.VEC.0 through BASE.VEC.4 each specify a respective set 70 of data channel registers. BASE.VEC.2 specifies the four sets 70 of data channel registers associated with UART0 through UART3 shown in FIG. 4. The address vector signals VEC.4 and VEC.3 specify which set 70 of data channel registers is to be addressed. For example, if VEC.4 and VEC.3 are both zero, the first set 70a of data channel registers is addressed. If VEC.4 and VEC.3 are both one, the last set 70d of data channel registers is addressed, and so on. The two least significant bits in the address vector are zero so that the first register in each set 70 is initially addressed. Thus, when the address vector is transmitted from the address register 66, the first register in the desired set 70 of data channel registers is specified. The functions performed by the data channel registers are described in more detail in the description of the operation.

Figure 7:
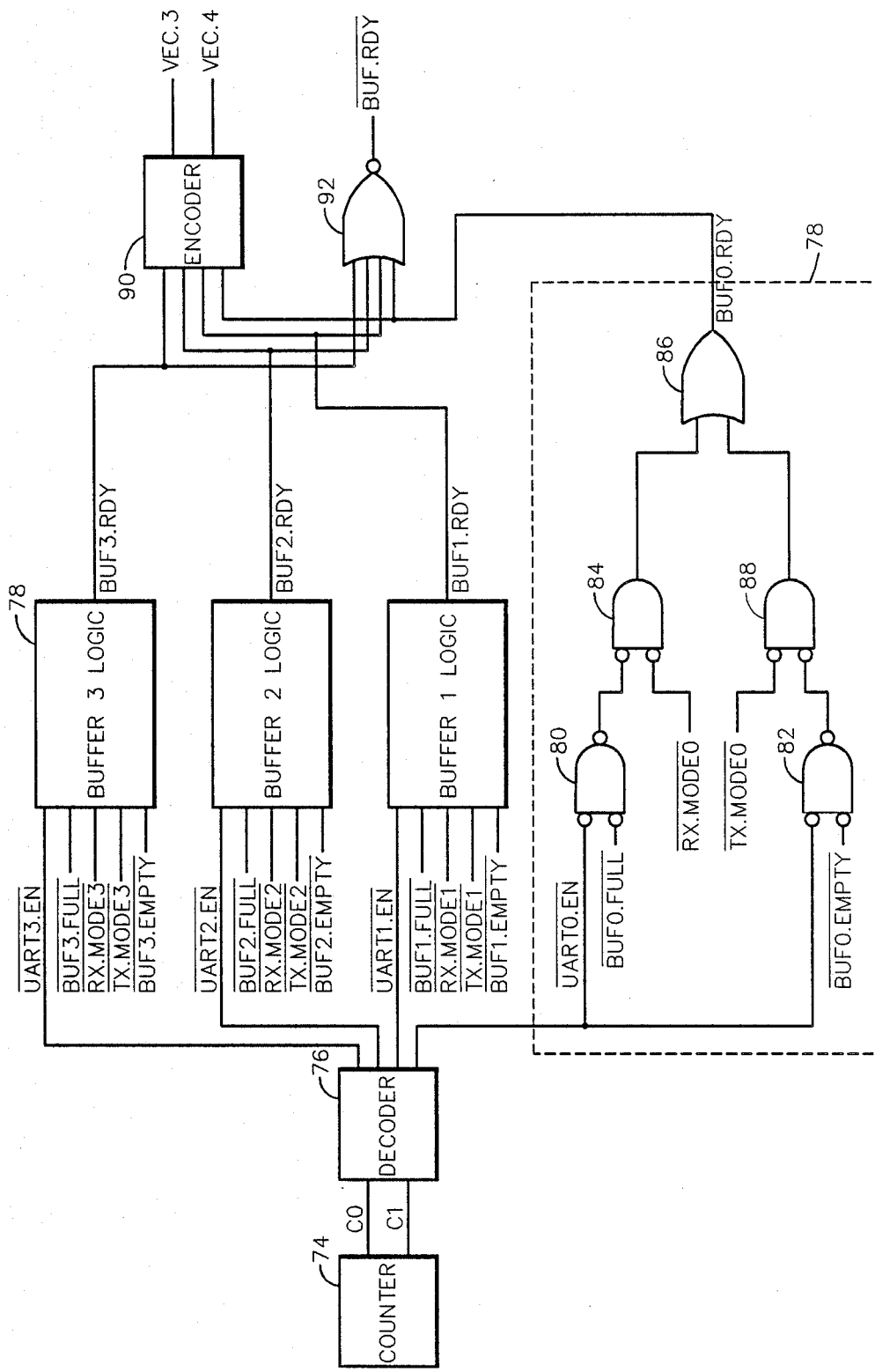
FIG. 7 is a circuit diagram of a second portion of the input/output module of FIG. 4.

Now referring back to FIG. 4, the buffer control and channel scanning logic circuit 62 also generates a $\overline{\text{BUFDY}}$/ signal to indicate that one of the four sections in the circular buffer is ready to send data to the main bus 26 or to one of the UARTs 60. The function of the buffer control and channel scanning logic 62 is shown in detail in FIG. 7. The buffer control and channel scanning logic 62 includes a 2-bit binary counter 74 having two output signals C0 and C1 whose values change at a constant rate from 0,0 to 0,1 to 1,0 to 1,1 and so on. These periodically changing signals are provided to a decoder 76 which generates four UART enable signals $\overline{\text{UART0N}}$/, $\overline{\text{UART1N}}$/, $\overline{\text{UART2N}}$/, and $\overline{\text{UART3N}}$/. Each of the four UART enable signals is activated one at a time so that the UARTs 60 are enabled to transmit data back and forth from the circular buffer 64 one at a time. The $\overline{\text{UART0N}}$/ signal is activated when the C0 and C1 signals are 0,0, respectively; the $\overline{\text{UART1N}}$/ signal is activated when the C0 and C1 signals are 0,1, respectively; the $\overline{\text{UART2N}}$/ signal is activated when the C0 and C1 signals are 1,0, respectively; and the $\overline{\text{UART3N}}$/ signal is activated when the C0 and C1 signals are 1,1, respectively. Each of the UART enable signals is transmitted to a respective buffer logic circuit 78. These logic circuits 78 are identical, and one of them is shown in detail within the box 78 shown in dotted lines.

The buffer 0 logic circuit 78 generates a buffer 0 ready (BUF0.RDY) signal that indicates that the section of the buffer 64 that services UART0, buffer section 0, is ready to receive another portion of data to be transmitted from the memory 24 to UART 0, or that the buffer section 0 is ready to send a portion of data from UART0 to the memory 24. The buffer 0 logic circuit 78 shown in the box 78 includes two NAND gates 80, 82 with complemented inputs each of which has one input that is supplied with a UART0 enable signal (UART0N/) generated by the decoder 76. The second input of the NAND gate 80 is supplied a buffer 0 full (BUF0ULL/) signal that is generated by the circular buffer 64 and indicates that the buffer section 0 is full and needs to have its contents transmitted to the memory 24 via the main bus 26. The second input of the other NAND gate 82 receives a buffer 0 empty (BUF0MPTY/) signal from the circular buffer 64 which indicates that buffer section 0 is empty and needs to receive another portion of data from the memory 24. The output of the NAND gate 80 is connected to the input of a two-input AND gate 84 with complemented inputs. The second input of the AND gate 84 is coupled to a receive mode (RXODE0/) signal which, if active, indicates that buffer section 0 is in a mode in which it is transmitting data to the memory from the UART0. The output of this AND gate 84 is supplied to an OR gate 86 which generates a buffer 0 ready (BUF0.RDY) signal. The output of the NAND gate 82 is connected to the input of a second two-input AND gate 88 with complemented inputs. The second input of the AND gate 88 is coupled to a transmit mode (TX.MODE0) signal which, if active, indicates that buffer section 0 is in a mode in which it is transmitting data to UART0 from the memory 24. The output of this AND gate 88 is supplied to the OR gate 86 which generates the BUF0.RDY signal.

The other buffer logic circuits 78, which are identical to the buffer 0 logic circuit 78 just described, receive analogous signals. The buffer 1 logic circuit receives UART1N/, BUF1ULL/, RXODE1/, TXODE1/, and BUF1MPTY/ signals; the buffer 2 logic circuit receives UART2N/, BUF2ULL/, RXODE2/, TXODE2/, and BUF2MPTY/ signals; and the buffer 3 logic circuit receives UART3N/, BUF3ULL/, TXODE3/, RXODE3/, and BUF3MPTY/ signals.

Each of the buffer ready signals generated by the buffer logic circuits 78 is supplied to both an encoder 90 and a NOR gate 92. The encoder 90 encodes the four buffer ready signals into the address vector signals VEC.3 and VEC.4 described above. Specifically, if the BUF0.RDY signal is activated, the encoder 90 provides zero outputs for both VEC.4 and VEC.3; if the BUF1.RDY signal is activated, the encoder 90 provides a zero VEC.4 output and a one VEC.3 output; if the BUF2.RDY signal is activated, the encoder 90 provides a one VEC.4 output and a zero VEC.3 output; and if the BUF3.RDY signal is activated, the encoder 90 provides one outputs for both VEC.4 and VEC.3. The NOR gate 92 generates a BUFDY/ signal from the four buffer ready signals that indicates that one of the buffer sections 0–3 in the circular buffer 64 is ready to be serviced by the CPU 20. The BUFDY/ signal is logic "0" when activated and is activated when any of the four buffer ready signals generated by the buffer logic circuits 78 is logic "1." Thus, the BUFDY/ signal indicates that one of the four buffer sections in the circular buffer 64 is ready to be serviced, and the two address vector signals VEC.4 and VEC.3 specify which of the buffer sections 0–3 requires servicing.

Figure 6:
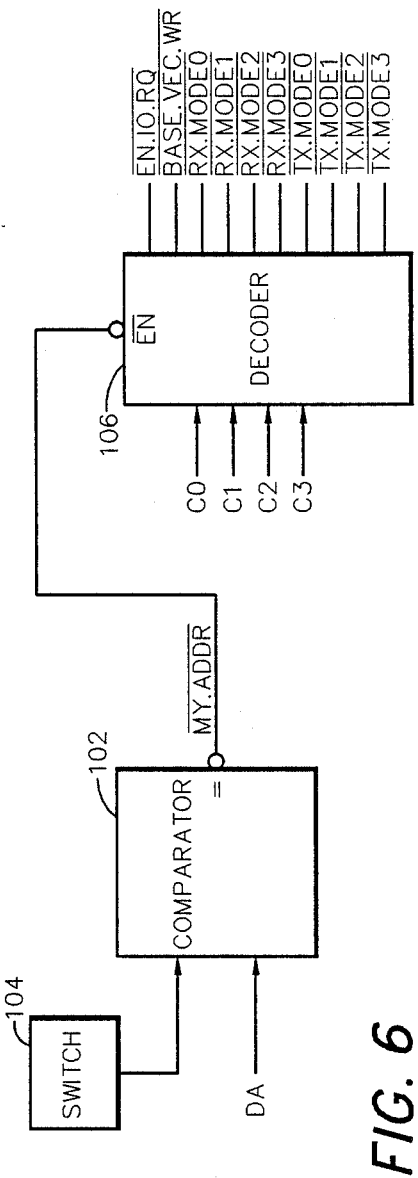
FIG. 6 is a circuit diagram of the address latch of FIG. 4.

The circular buffer 64 is connected to a data transceiver 94 that acts as a temporary storage device for data being sent to or received from an address/data transceiver 96 that is connected to the main bus 26. The data transceiver 94 is of conventional, well known design, comprising 74ALS245A octal tri-state bus transceiver integrated circuit chips commercially available from National Semiconductor. The address/data transceiver 96 is also of conventional, well known design and comprises 8835 integrated circuit chips commercially available from National Semiconductor. The address/data transceiver 96 transmits the address portion of the signals it receives from the main bus 26 to an address latch 98 for temporary storage before the address is decoded by an address decoder 100. The address latch 98 receives the device address of the I/O module 28 as well as a plurality of control signals which control the operation of the I/O module 28. The address latch 98 is of conventional, well known design and comprises 74ALS574 integrated circuit chips commercially available from National Semiconductor. The detailed function of the address decoder 100 is shown in FIG. 6 to include a comparator 102 having a first input that receives the output of a switch 104 that contains the address of the I/O module 28. The second input of the comparator 102 is connected to receive the device address DA as sent by the CPU 20. If the device address sent by the CPU matches the I/O module address as specified by the switch 104, the comparator 102 activates a MYDDR/ signal to indicate that the CPU 20 intended the transmission to be sent to the I/O module 28. If the addresses do not match, the CPU 20 intended the transmission to be sent to another device, perhaps a different I/O module, and the transmission is ignored.

The MYDDR/ signal is sent to the enable input of a decoder 106 which receives from the address latch 98 the four control signals C0, C1, C2, and C3 transmitted by the CPU 20. Each binary combination of the control signals generates a respective signal that controls a particular function of the I/O module 28. These signals include four buffer receive mode (RXODE/) signals, four buffer transmit mode (TXODE/) signals, an enable input/output requests (ENO.REQ/) signal, and a base vector write (BASEEC.WR/) signal. The RXODE/ and TXODE/ signals are transmitted to the buffer control and channel scanning logic circuit 62. The BASEEC.WR/ signal is transmitted to the enable input of the address vector register 66 and enables the base vector of that register 66 to be changed by the CPU 20 so that it specifies a different set 70 of data channel control blocks. The ENO.REQ/ signal is transmitted to a data channel request circuit 108 in the box indicated by the dotted lines in FIG. 4.

The data channel request circuit 108 includes a main control sequencer 110 connected to a state decoder 112. The main control sequencer 110 receives the data strobe (DS) signal, the non-maskable interrupt (NMI) signal, a priority-in (PRIN) signal, and the hold-request (HOLDQ/) signal from the main bus 26 and the buffer ready signal BUFDY/ from the buffer control logic 78. The DS signal is a periodically activated signal sent by the CPU 20 that enables the generation of requests for data transmission on the main bus 26 to be synchronized with predetermined clock cycles of the CPU 20. The NMI signal disables requests for the main bus 26 made by the I/O modules 28 in cases where the CPU 20 has received an interrupt with a priority level greater than that of any of the I/O modules 28. The $\overline{\text{PRIN}}$ signal is transmitted by other I/O modules 28 and is part of a daisy-chained priority system that determines which of the I/O modules 28 connected to the main bus 26 has priority to request the use of the main bus 26 for data transmission. The $\overline{\text{HOLDQ}}/$ signal is transmitted by the CPU 20 to all of the I/O modules 28 to indicate that the CPU 20 has responded to a request for the main bus 26 transmitted by one of the I/O modules 28 and that all further of such requests are to be terminated. The $\overline{\text{BUFDY}}/$ signal is the signal that, when activated, begins the process of requesting use of the main bus 26 since the $\overline{\text{BUFDY}}/$ signal indicates that the circular buffer 64 has data to send to the main bus 26 or is ready to receive data from the main bus 26. The output of the state decoder 112 is transmitted to a three-input NAND gate 114. A second input of the NAND gate 114 receives the $\overline{\text{ENO.REQ}}/$ signal from the address decoder 100 as described above. The third input of the NAND gate 114 receives the $\overline{\text{PRIN}}$ signal after it has been inverted by an inverter 116. The output of the NAND gate 114 is transmitted to an I/O channel request logic circuit 118 that also receives the $\overline{\text{DS}}$, $\overline{\text{NMI}}$, $\overline{\text{PRIN}}$, and $\overline{\text{HOLDQ}}/$ signals described above. The I/O channel logic circuit 118 generates two signals from these input signals one of which is an I/O channel request ($\overline{\text{IOCHEQ}}/$) signal and the other of which is an I/O channel vector out ($\overline{\text{IOCHEC.OUT}}/$) signal. The $\overline{\text{IOCHEQ}}/$ signal is a request for the use of the main bus 26 and the $\overline{\text{IOCHEC.OUT}}/$ signal is an enable signal that causes the address vector register 66 to send its address vector to the address/data transceiver 96 for transmission to the CPU 20. The $\overline{\text{IOCHEQ}}/$ signal is provided to an open collector driver 120 connected to the main bus 26 and to a NAND gate 122 that generates a priority out ($\overline{\text{PROUT}}$) signal. The other input of the NAND gate 122 receives the $\overline{\text{PRIN}}$ signal generated by the inverter 116. As is explained in more detail below, the $\overline{\text{PROUT}}$ signal is part of a daisy-chained priority system and effectively prevents other I/O modules 28 from requesting use of the main bus 26.

The basic functional operation of the data channel request circuit 108 in the block shown in dotted lines in FIG. 4 is explained in connection with FIG. 5, which shows a logic circuit 124 that receives the $\overline{\text{PRIN}}$, $\overline{\text{BUFDY}}/$, $\overline{\text{NMI}}$, $\overline{\text{HOLDQ}}/$, $\overline{\text{DS}}$, and $\overline{\text{ENO.REQ}}/$ signals as inputs and generates the $\overline{\text{PROUT}}$, $\overline{\text{IOCHEQ}}/$, and $\overline{\text{IOCHEC.OUT}}/$ signals as outputs. The $\overline{\text{IOCHEQ}}/$ signal, which is generated by a three-input NAND gate 126, is activated when each of three conditions is satisfied: (1) The enable I/O request signal must be activated; (2) Neither of the non-maskable interrupt and hold-request signals must be activated; and (3) The circular buffer 64 must be ready to transmit or receive data and the priority-in signal must be activated. These three conditions are implemented by an inverter 128 having the $\overline{\text{ENO.REQ}}/$ signal as its input, a two-input AND gate 130 having the $\overline{\text{NMI}}$ and $\overline{\text{HOLDQ}}/$ signals as its inputs, and a two input AND gate 132 with complemented inputs having the $\overline{\text{BUFDY}}/$ and $\overline{\text{PRIN}}$ signals as its inputs, respectively. The $\overline{\text{IOCHEC.OUT}}/$ signal is activated shortly after the $\overline{\text{IOCHEQ}}/$ signal is activated upon the falling edge of the periodic $\overline{\text{DS}}$ signal, which is implemented by a two-input NAND gate 134 with complemented inputs having the DS and $\overline{\text{IOCHEQ}}/$ signals as its inputs.

Figure 8:
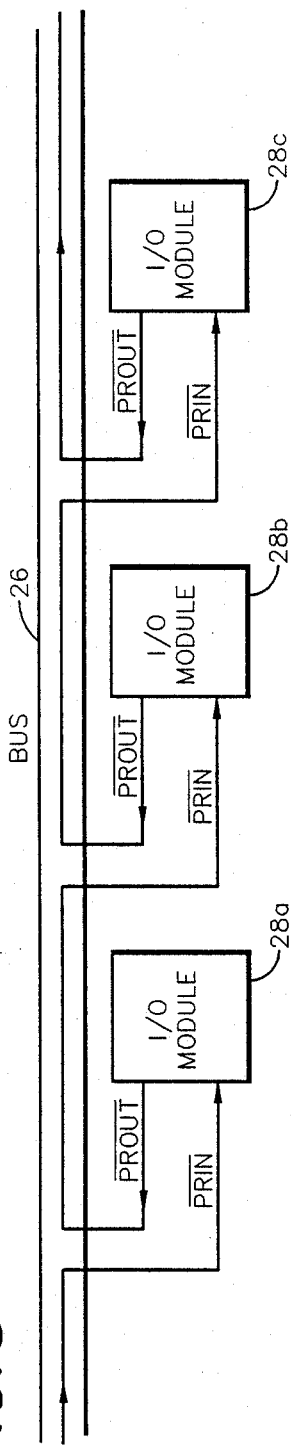
FIG. 8 is a schematic diagram of the input/output module priority system of the computer of FIG. 1.

The daisy-chained priority system is explained with reference to FIGS. 5 and 8. As shown in FIG. 8, each of three I/O modules 28 has a $\overline{\text{PRIN}}$ signal as an input and a $\overline{\text{PROUT}}$ signal as an output. These three I/O modules 28 are daisy-chained, meaning that the $\overline{\text{PROUT}}$ signal output by the leftmost I/O module 28a is supplied as the $\overline{\text{PRIN}}$ signal to the input of the "downstream" I/O module 28b shown in the middle, and the $\overline{\text{PROUT}}$ signal generated by the middle I/O module 28b is supplied to the $\overline{\text{PRIN}}$ signal input of the rightmost I/O module 28c, and so on. In this priority scheme, an I/O module 28 has priority over all downstream I/O modules 28. Thus, in FIG. 8, the leftmost module 28a has the highest priority, the middle module 28b has the second highest priority, and the rightmost module 28c has the lowest priority. If one of the I/O modules 28 wishes to generate an I/O channel request, it may do so if its $\overline{\text{PRIN}}$ signal is activated as described above. However, when the I/O channel request is made, the requesting I/O module 28 deactivates its $\overline{\text{PROUT}}$ signal, and as a result, none of the downstream I/O modules 28 can generate an I/O channel request. Now referring to FIG. 5, the $\overline{\text{PROUT}}$ signal generated by each I/O module 28 is produced by the two-input NAND gate 122 having one input that receives the $\overline{\text{IOCHEQ}}/$ signal and another input that receives the $\overline{\text{PRIN}}$ signal via the inverter 116. If the $\overline{\text{IOCHEQ}}/$ signal is activated, and thus becomes logic "0," the PROUT signal produced by the NAND gate 122 will become logic "1." As a result, when this logic "1" is supplied to the $\overline{\text{PRIN}}$ input of the next downstream I/O module 28, that I/O module will be prevented from generating an I/O channel request since such a request cannot be made unless the $\overline{\text{PRIN}}$ signal is logic "0."

OPERATION OF THE PREFERRED EMBODIMENT

During the operation of the preferred embodiment just described, data is transferred between the memory 24 of the computer and the peripheral I/O devices 30 under the control of the central processing unit 20. One or more of the I/O devices 30 may transmit or receive blocks of data during the same period of time by operating on a round-robin basis. For example, if each of the four I/O devices 30 shown in FIG. 1 needs to transmit a block of data to the memory 24, each device 30 in turn transmits a small portion of its data block at a time until its complete data block has been transmitted. In the actual embodiment, each I/O device 30 transmits one word of data at a time, each data word being 64 bits in length. Of course, other sized data portions may be used in the practice of the invention. Because each of the I/O devices 30 is serviced on a round-robin basis, no single I/O device will 30 have a monopoly on the bus, and the CPU 20 will be able to service many I/O devices simultaneously.

The operation of the preferred embodiment is explained below in connection with the transfer of a first data file (FILE 1) from the memory 24 of the computer to UART0 and then with the transfer of a second data file (FILE 2) from UART2 to the memory 24. Initially, a data transfer request is made that requests a particular data file be moved between the memory 24 and a particular I/O device 30. The data transfer request may be made, for example, by a computer program being executed by the CPU 20 or by a user who types in such a request from a keyboard. In this example, the data request specifies that FILE 1 be transferred to UART0 of the I/O module 28 having a device address 10, for example.

Figure 10A:
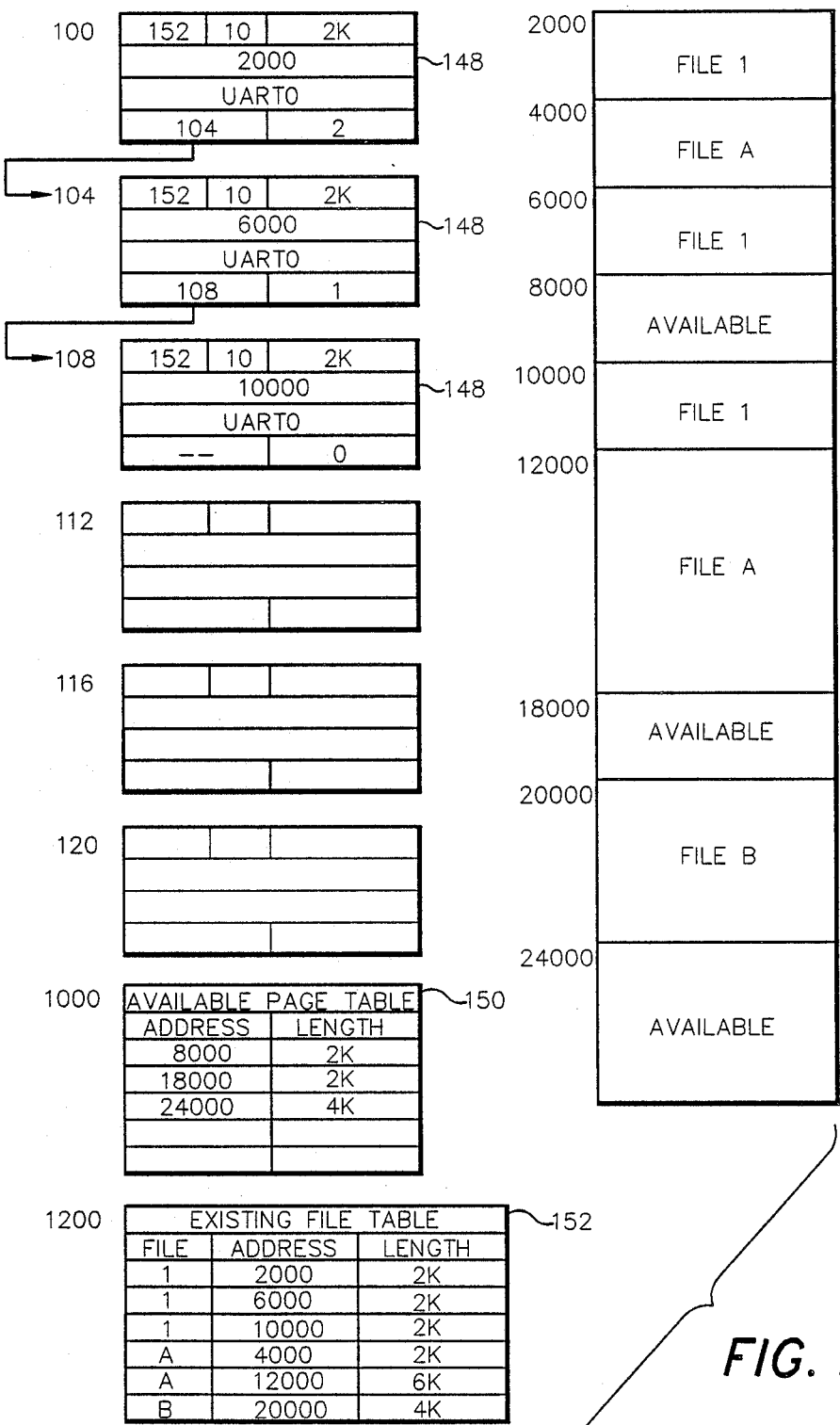
FIG. 10a shows a portion of the memory of the computer of FIG. 1 in a first state.

Now referring to FIG. 10a, a portion of the memory 24 is shown to include a number of memory portions reserved for a number of data channel control blocks 148. These data channel control blocks 148 occupy memory locations 100-123. The memory includes an available page table 150 at memory location 1000 and an existing file table 152 at memory location 1200. The memory 24 also includes a portion in which data files can be stored beginning at memory location 2000 and continuing through memory location 28,000. The use of available page tables and existing file tables is conventional, and such tables are used in various well known computer operating systems such as VAX/VMS available from Digital Equipment Corporation and OS/MVS available from International Business Machines Corporation.

Prior to the transfer of FILE 1 from the memory 24 to UART0, the contents of the memory locations 2000-28,000 are as indicated in the right-hand portion of FIG. 10a. A first portion of FILE 1 2000 words long is stored at memory location 2000; a first portion of another file, FILE A, is stored at memory locations 4000-6000; the second portion of FILE 1 is stored at memory locations 6000-8000; memory locations 8000-10,000 are empty; the third and final portion of FILE 1 is stored at locations 10,000-12,000; the second portion of FILE A is stored at memory locations 12,000-18,000; locations 18,000-20,000 are empty; another file, FILE B, is stored at memory locations 20,000-24,000; and memory locations 24,000-28,000 are empty. In this embodiment, the memory 24 is divided into memory pages, each of which is 2048 words long. Thus, each of the blocks in the memory 24 is one or more pages long. The memory addresses have been rounded to the nearest thousand for convenience. The available page table 150 contains a list of all the empty blocks in the memory 24 and their lengths and addresses, and the existing file table 152 contains a listing of all portions of the files stored in the memory 24 and their lengths and addresses.

After a data transfer request is made, the operating system of the computer sets up one or more data channel control blocks 148 in the memory 24, depending upon whether data is to be transferred to or from noncontiguous portions of the memory 24. If only a single contiguous portion of the memory 24 is to be accessed, only one data channel control block 148 is needed. If there are noncontiguous portions of the memory 24 to which data will be transferred, one data channel control block 148 is required for each portion. Each of the data channel control blocks 148 contains the information required to transfer a block of data to or from a single contiguous portion of memory 24, and the data channel control blocks 148 have the same data format as each set 70 of the data channel registers. As described above, this format includes a channel microcode address, a device address, the source and destination addresses, etc.

In this case in which FILE 1 is being transferred from the memory 24 to UART0, the CPU 20 constructs three data channel control blocks 148 in the memory 24 starting at memory address 100 to facilitate the transfer of FILE 1 from the memory since FILE 1 occupies three noncontiguous blocks of memory. In order to accomplish this, the CPU 20 writes the appropriate channel microcode address into the CMA portion of each data channel control block 148. Then the CPU writes in the appropriate device address as specified by the data transfer request in the DA portion of each of the data channel control blocks, which in this case is 10. The destination address is then written to the third memory location in each of the control blocks 148, which in this case is UART0. The remaining information in the control blocks 148, namely the word count, the source address, the pointer, and the block count, is retrieved or constructed by the CPU 20 from the existing file table 152.

The CPU searches the existing file table 152 for all memory addresses associated with FILE 1, the file being read from the memory. The CPU 20 finds that FILE 1 is stored in three noncontiguous blocks of memory, one starting at memory location 2000, one starting at memory location 6000, and one starting at memory location 10,000. The existing file table 152 also indicates that each of these blocks is 2000 words long. Accordingly, the CPU 20 writes the memory address 2000 into the source address portion of the first data channel control block 148 at memory location 100 since that is where the first portion of FILE 1 is stored. Similarly, the memory address 6000 is written to the source address portion of the second data channel control block 148 since that is where the second portion of FILE 1 is stored, and the memory address 10,000 is written to the source address portion of the third data channel control block 148. The word count portion of each of the data channel control blocks 148 is loaded with 2000 since each of the blocks of FILE 1 in memory is 2000 words long.

The block count portion of the first control block 148 at memory location 100 is loaded with the number two since there will be two blocks of data left to be transferred after the first block of FILE 1 is transferred. Note that the block count of each control block 148 also equals the number of subsequent control blocks 148, since one control block 148 is set up for each noncontiguous block of data in the memory 24. Similarly, the block count of the second control block 148 is loaded with the number one since only one control block 148 and its associated data block in memory remain, and the block count of the third data channel control block 148 is set to zero.

The only portion of the data channel control blocks 148 left unspecified is the pointer portion. This portion simply points to the next data channel control block in memory that relates to the file being transferred. In this case, the pointer portion of the first control block 148 at memory location 100 contains the memory address 104, which specifies the location of the second control block, and the second control block 148 contains the memory address 108, which specifies the location of the third control block 148. Note that the pointer portion of the third data channel control block 148 at memory location 108 is left unspecified since it is the last control block 148 associated with the transfer of FILE 1.

After the three data channel control blocks 148 have been constructed in the memory 24 by the CPU 20, the CPU transfers the contents of the first data channel control block 148 in the memory at the memory location 100 to the set 70 of data channel registers in the CPU which is dedicated exclusively to data transfers into and out of UART0. In this case, this set 70 of data channel registers is the one beginning at the register address BASE.VEC.2 as indicated in FIG. 1.

Before the file transfer may begin, a number of control signals must be sent. First, the CPU 20 sends the $\overline{\text{ENO.REQ}}$/ signal to the I/O module 28 so that the I/O module will be able to generate I/O channel requests. As described above in connection with the circuit description, this $\overline{\text{ENO.REQ}}$/ signal is generated by the decoder 40 in the CPU which generates the control signals C0–C4 transmitted to the address decoder 100 in the I/O module 28 which then generates the EN.IO.REQ signal therefrom. Another preliminary step involves sending an active $\overline{\text{TXODE0}}$/ signal to the buffer control and channel scanning logic 62, which indicates that the portion of the circular buffer 64 that services UART0 will be transmitting data to UART0 from the memory 24. As described above in connection with the buffer logic circuits 78, the $\overline{\text{TXODE0}}$/ signal enables the generation of the BUF0.RDY signal when the $\overline{\text{BUF0MPTY}}$/ signal is activated, signalling that the circular buffer 64 has finished sending two words of data to UART0 and needs the CPU 20 to send it two more words.

At this point, FILE 1 may begin to be transferred from the memory 24 to UART0. This data transfer is made two words at a time, each word being eight bytes, or 64 bits long. Now referring to FIG. 7, soon after the $\overline{\text{TXODE0}}$/ signal is activated by the CPU, a BUF0.RDY signal will be activated since the buffer section 0 of the circular buffer 64 will be empty and the $\overline{\text{BUF0MPTY}}$/ signal will be active. As a result, the $\overline{\text{BUFDY}}$/ signal will be activated and the encoder 90 will produce a logic "0" VEC.3 signal and a logic "0" VEC.4 signal, these particular signals specifying the set 70 of data channel registers dedicated exclusively to UART0.

Figure 5:
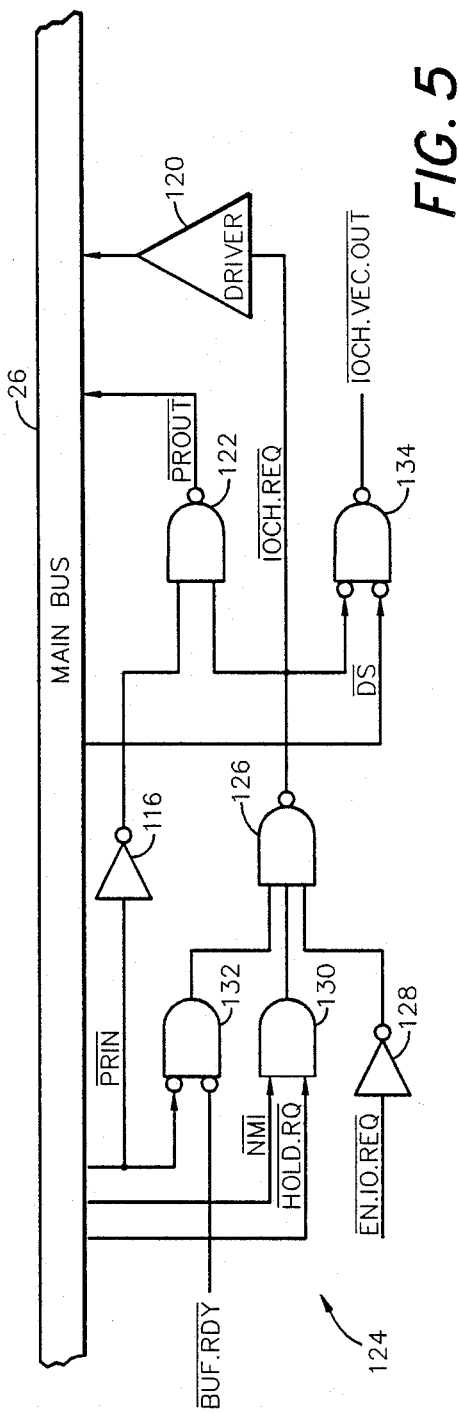
FIG. 5 is a circuit diagram of one portion of the input/output module of FIG. 4.

Now referring to FIG. 5, the active $\overline{\text{BUFDY}}$/ signal will generate an active $\overline{\text{IOCHEQ}}$/ signal, assuming that the I/O module 28 has priority and that neither the $\overline{\text{NMI}}$ nor the $\overline{\text{HOLDQ}}$/ signal has been activated by the CPU. Then, upon the falling of the periodic $\overline{\text{DS}}$ signal, the $\overline{\text{IOCHEC.OUT}}$/ signal is activated and causes the address vector register 66 to transmit the address vector to the vector register 34 in the CPU, the address vector containing the register address specifying the set 70 of data channel registers associated with UART0.

Referring now to FIG. 2, the address vector is then sent from the vector register 34 to the address decoder 32, which addresses the register files 22 and causes the channel microcode address of the first data channel register associated with UART0 to be sent to the branch register 46. The branch register 46, having an active $\overline{\text{IOCHEQ}}$/ signal, activates the interrupt service routine associated with its channel microcode address. In this example, the channel microcode address is 152, and a flowchart of the interrupt service routine having channel microcode address 152 is shown in FIG. 11.

Figure 11:
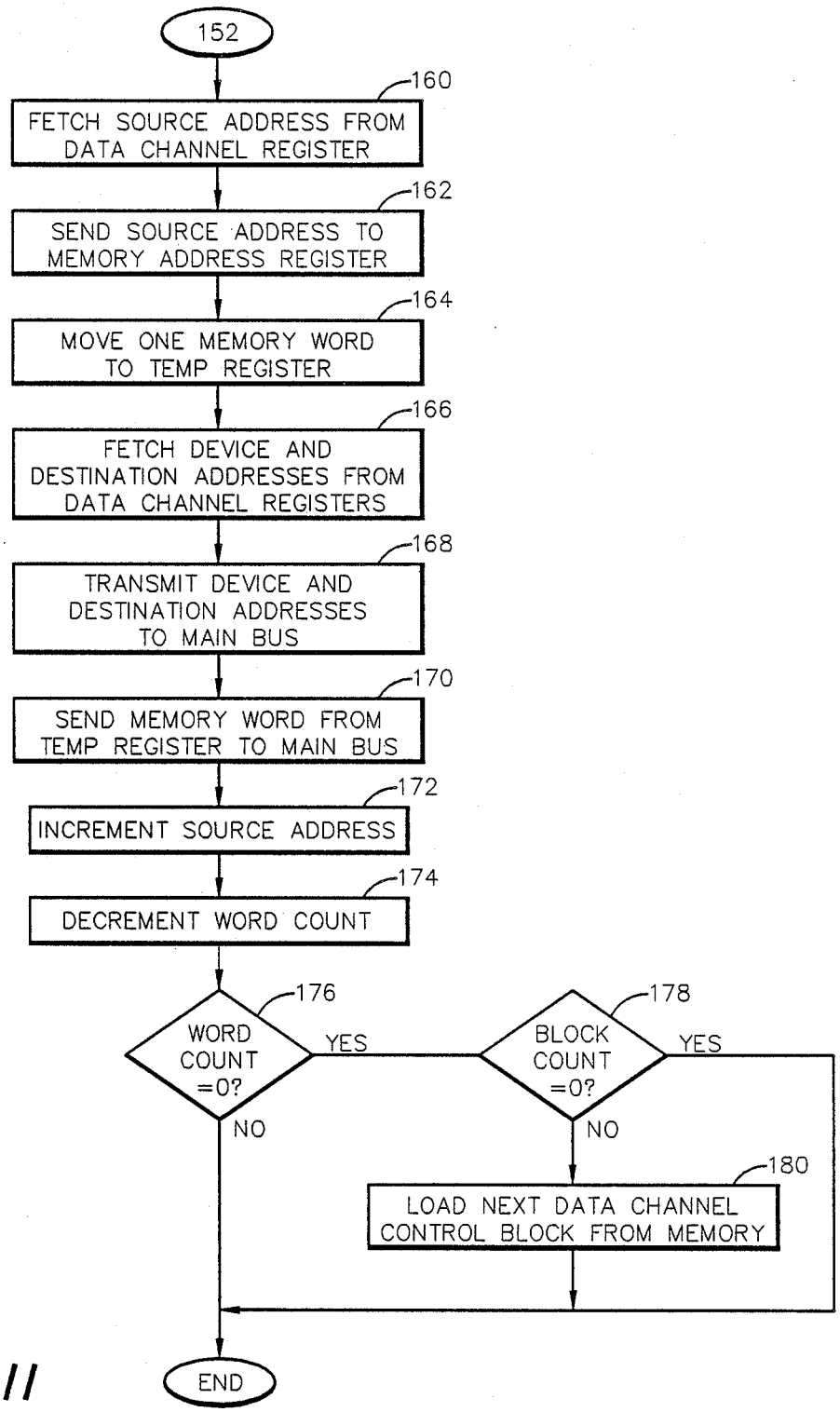
FIG. 11 is a flowchart of a first interrupt service routine of the computer of FIG. 1.

Now referring to FIG. 11, in order to begin a one word data transfer, at step 160, the source address of the data to be transferred is fetched from the second data channel register associated exclusively with UART0. At step 162, this source address is transmitted to the memory address register 56 so that the data can be retrieved from the memory 24. Next, at step 164, the memory word at the memory location specified by the source address is moved from the memory 24 to the temporary data register 42. At step 166, the device and destination addresses are retrieved from the appropriate data channel registers associated with UART0, and at step 168 they are transmitted to the main bus 26. At step 170, the memory word stored in the temporary data register 42 is transmitted to the main bus 26.

At this point, each of the I/O modules 28 will detect the device and destination addresses and the memory word on the main bus, but only that I/O module 28 having the matching device address will read the memory word and store it in its circular buffer 64 for transmission to UART0. The destination address is used by the I/O module 28 to determine to which of the UARTs 60 the memory word is to be transmitted.

After the first data word is transmitted to UART0, at step 172, the interrupt service routine 152 causes the CPU to increment the source address stored in the appropriate data channel register so that it points to the next data word of FILE 1 in memory. At step 174 the word count is decremented by one since one data word has just been transferred to UART0 and hence there is one less data word to be transferred. At step 176, the value of word count is tested to determine if it is zero. If word count is not zero, the interrupt service routine ends. If it is zero, then there are no more data words in the block in memory from which the data transfer is taking place, and either the data file transfer is completely finished or the next data channel control block must be retrieved from the memory 24 and stored in the set 70 of data channel registers associated with UART0.

Assuming that the word count is zero, at step 178 the value of block count is tested. If block count is zero, then all of the data stored in FILE 1 in the three non-contiguous blocks has been retrieved and sent to UART0, and the interrupt service routine is finished. If block count is not zero, then there is another data block in the memory 24 in which data from FILE 1 is stored. Assuming that block count is not zero, at step 180 the next data channel control block 148 is retrieved from the memory 24 and stored in the set 70 of four data channel registers associated exclusively with UART0. This step 180 is accomplished by reading the pointer stored in the pointer portion of the current data channel control block 148 stored in the data channel registers. This pointer portion, as described above, contains the memory address of the next data channel control block 148 stored in the memory 24. Using this memory address, the next data channel control block 148 is retrieved from the memory 24 and stored in the set 70 of data channel registers associated with UART0. This new data channel control block 148 will contain the memory address in which the next block of the FILE 1 is located, the number of words in this block, and how many blocks are left to be transferred.

This step 180 is extremely advantageous in that it happens automatically without requiring the execution of an interrupt and the associated interrupt context switch. As a result, data can be transferred from non-contiguous blocks in the memory 24 without the execution of an interrupt, and this process is faster and more efficient than the prior art computers described above in which an interrupt needs to be generated each time the end of a block in memory is reached and a new block needs to be accessed.

The interrupt service routine just described is performed each time the CPU recognizes a data channel request made by the I/O module 28 on behalf of UART0. The I/O module makes data channel requests until FILE 1 has been completely transferred from the memory 24 to UART0. The data channel requests are made at a rate determined for the most part by how fast the circular buffer 64 can transmit a word of data to UART0.

Figure 10B:
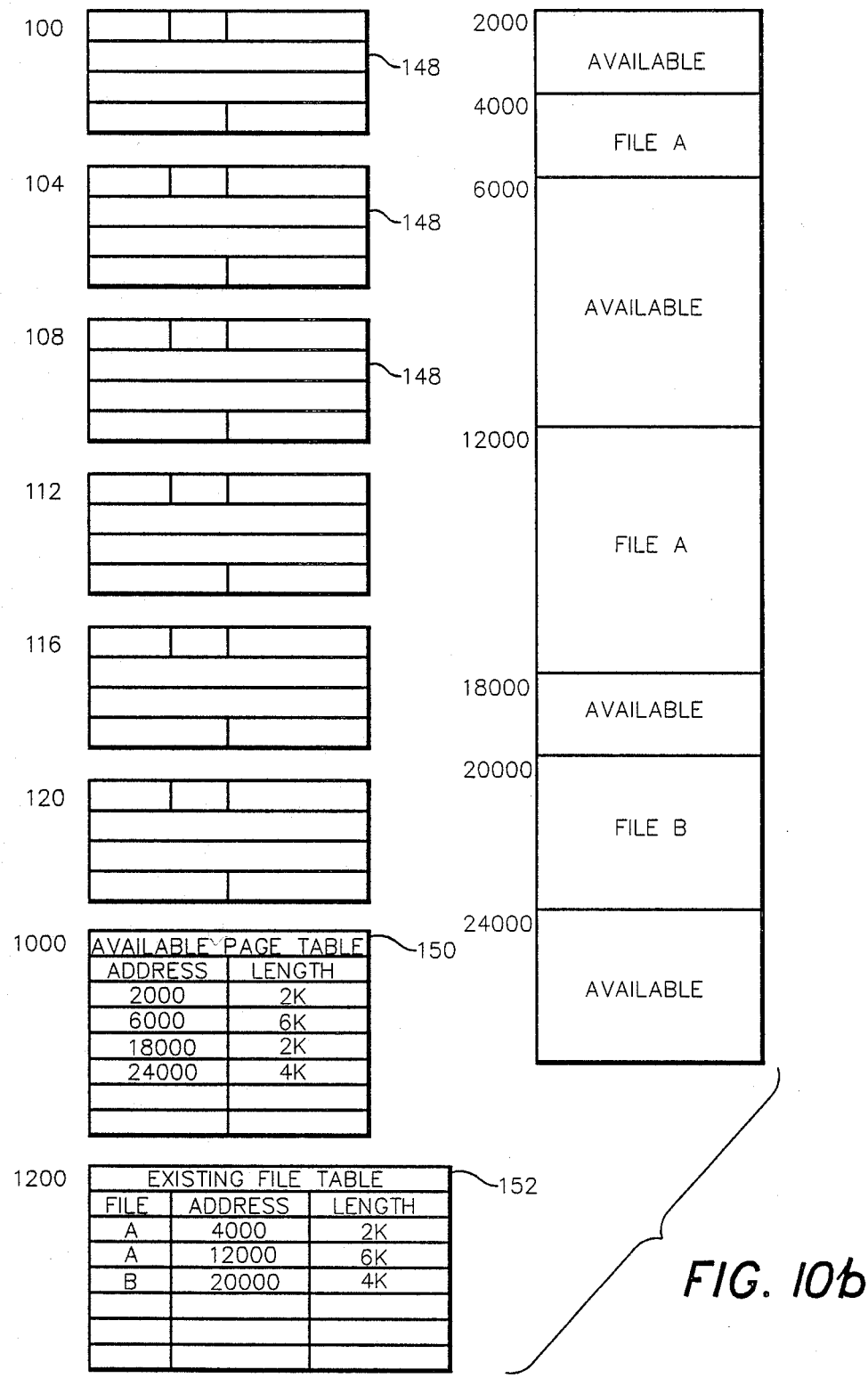
FIG. 10b shows a portion of the memory of the computer of FIG. 1 in a second state.

After FILE 1 has been transferred from the memory 24 to UART0, the state of the memory 24 is as shown in the righthand portion of FIG. 10b, and the available page table 150 and the existing file table 152 have been updated to reflect this new memory state.

The above-mentioned transfer of the second data file, FILE 2, from UART2 to the memory 24 begins with a data request, which was described in connection with the transfer of FILE 1. The data request to transfer FILE 2 includes a source address specifying UART 2, the device address 10 of the I/O module 28, and the length of FILE 2, which in this case assume is 8000 words. After the data request is received, the CPU constructs the data channel control blocks 148 necessary to accomplish this FILE 2 transfer. Constructing the control blocks 148 is accomplished by checking the available page table to determine the locations of empty memory portions sufficient to accommodate FILE 2. In this case, as indicated in the table 150 in FIG. 10b, a block of 2000 memory words is available at memory location 2000 and another block of 6000 is available at memory location 6000. Accordingly, the CPU begins to construct the data channel control blocks 148 shown in FIG. 10c by writing the destination address 2000 and word count 2000 in the appropriate locations in the first data channel control block 148 at memory location 100 and the destination 6000 and word count 6000 in the second data channel control block 148 at memory location 104. Note that in this case only two data channel control blocks 148 are necessary since FILE 2 can be written into two noncontiguous portions of the memory 24. The remaining portions of the control blocks 148 are constructed by including the device address 10, the source addresses specifying UART2, the appropriate channel microcode address which in this case is 210, the number of blocks remaining in the block count, and finally the pointer 104 in the first data channel control block to specify the address of the second data channel control block.

After these two data channel control blocks 148 have been constructed in the memory 24 by the CPU 20, the CPU transfers the contents of the first data channel control block 148 in the memory at the memory location 100 to the set 70 of data channel registers in the CPU which is dedicated exclusively to data transfers into and out of UART2, as indicated in FIG. 1.

Before the file transfer may begin, the preliminary control signals described above must be sent. First, the CPU 20 sends the $\overline{ENO.REQ}/$ signal to the I/O module 28 so that the I/O module will be able to generate I/O channel requests. Then an active $\overline{RXODE2}/$ signal is sent to the buffer control and channel scanning logic 62, which indicates that the portion 2 of the circular buffer 64 that services UART2 will be receiving data from UART2 and sending it to the memory 24. As described above in connection with the buffer logic circuits 78, the $\overline{RXODE2}/$ signal enables the generation of the BUF2.RDY signal when the $\overline{BUF2ULL}/$ signal is activated, signalling that the circular buffer 64 has two words of data from UART2 and is ready to send them to the memory 24.

At this point, FILE 2 may begin to be transferred from the UART2 to the memory 24. As above, this data transfer is also made two words at a time. Now referring to FIG. 7, soon after the $\overline{RXODE2}/$ signal is activated by the CPU, a BUF2.RDY signal will be activated when the buffer section 2 of the circular buffer 64 is full and the $\overline{BUF2ULL}/$ signal is active. As a result, the $\overline{BUFDY}/$ signal will be activated and the encoder 90 will produce a logic "1" VEC.4 signal and a logic "0" VEC.3 signal, these particular signals specifying the set 70 of data channel registers dedicated exclusively to UART2.

As in connection with the transfer of FILE 1, the active $\overline{BUFDY}/$ signal will generate an active $\overline{IO\ CHEQ}/$ signal and, upon the falling of the periodic DS signal, the $\overline{IOCHEC.OUT}/$ signal is activated and causes the address vector register 66 to transmit the address vector to the vector register 34 in the CPU, the address vector containing the register address specifying the set 70 of data channel registers associated with UART2.

Referring again to FIG. 2, the address vector is then sent from the vector register 34 to the address decoder 32, which addresses the register files 22 and causes the channel microcode address of the first data channel register associated with UART2 to be sent to the branch register 46. The branch register 46, having an active IOCH.REQ signal, activates the interrupt service routine associated with its channel microcode address. In this example, the channel microcode address is 210, and a flowchart of the interrupt service routine having channel microcode address 210 is shown in FIG. 12.

Figure 12:
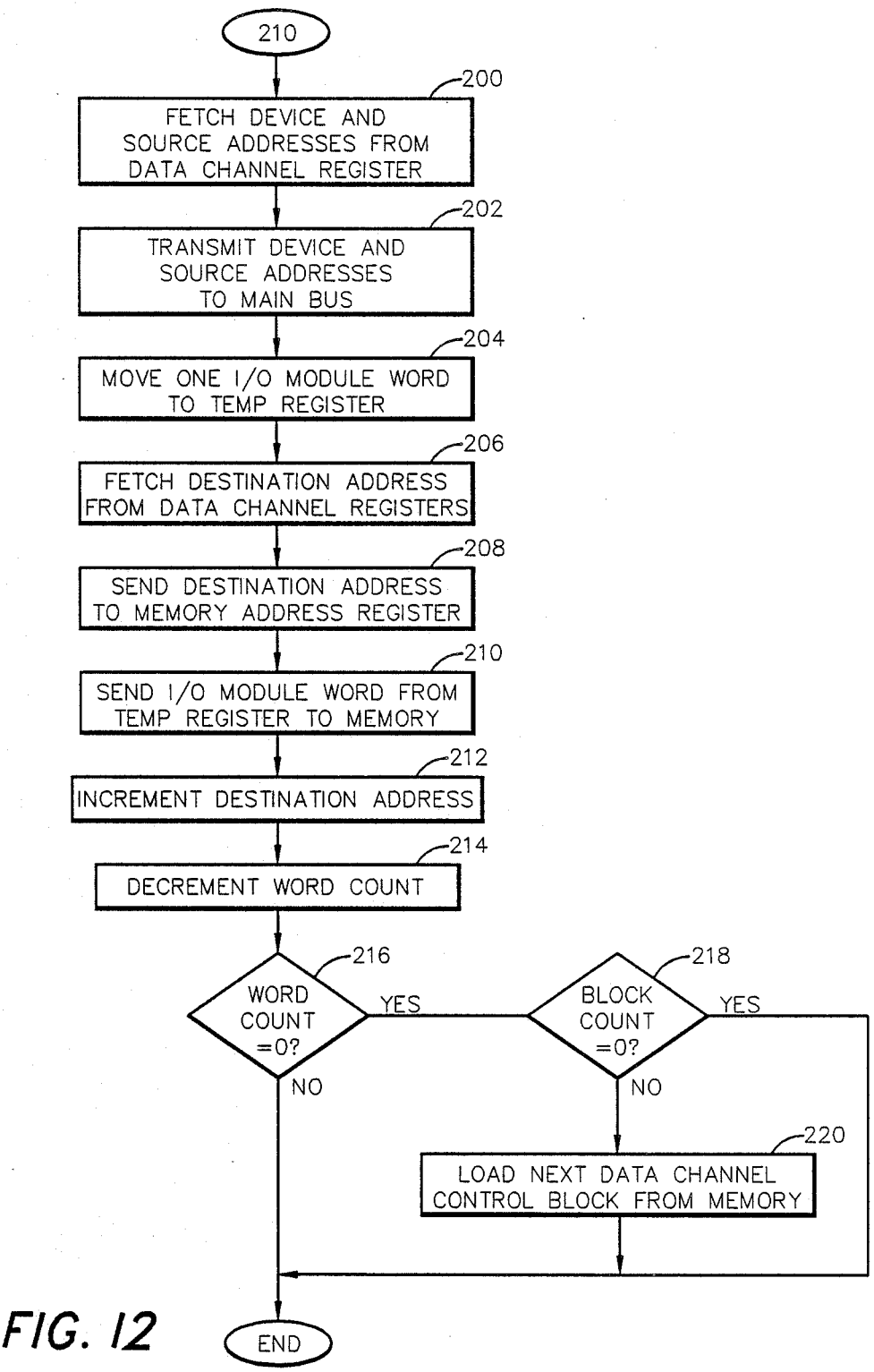
FIG. 12 is a flowchart of a second interrupt service routine of the computer of FIG. 1.

Now referring to FIG. 12, in order to begin a one word data transfer from the UART2 to the memory 24, at step 200, the device and source addresses of the data to be transferred from UART2 are fetched from the data channel registers associated exclusively with UART2. At step 202, these addresses are transmitted to the main bus 26. In response to detecting its device address, the I/O module 28 sends onto the main bus 26 a word of data from the circular buffer 64 that was sent by UART2 as specified by the source address. Next, at step 204, the I/O module word is moved from the main bus 26 to the temporary data register 42. At step 206, the destination address is retrieved from the appropriate data channel register associated with UART2, and at step 208 the destination address is transmitted to the memory address register 56. At step 210, the I/O module word stored in the temporary data register 42 is stored in the memory 24 at the location specified by the memory address register 56.

After the first data word is transmitted to the memory from UART2, at step 212, the interrupt service routine 210 causes the CPU to increment the destination address stored in the appropriate data channel register so that it points to the memory location in which the next data word should be stored. At step 214 the word count is decremented by one since one data word has just been transferred from UART2 and hence there is one less data word to be transferred. At step 216, the value of word count is tested to determine if it is zero. If the word count is not zero, the interrupt service routine ends. If it is zero, then there are no more data words to be stored in the current block in memory, and either the data transfer is completely finished or the next data channel control block must be retrieved from the memory 24 and stored in the set 70 of data channel registers associated with UART2.

If the word count is zero, at step 218 the value of block count is tested. If block count is zero, then all of the data in FILE 2 has been stored in the two noncontiguous blocks in the memory 24, and the interrupt service routine is finished. If block count is not zero, then there is another data block in the memory 24 in which the second portion of FILE 2 needs to be stored. Assuming that block count is not zero, at step 220 the next data channel control block 148 is retrieved from the memory 24 and stored in the set 70 of four data channel registers associated exclusively with UART2. This step 220 is accomplished by reading the pointer stored in the pointer portion of the current data channel control block 148 stored in the data channel registers. This new data channel control block 148 will contain the memory address 6000 in which the next portion of the FILE 2 is to be stored and the number of words in this portion.

Like step 180, this step 220 is advantageous in that it happens automatically without requiring the execution of an interrupt. As a result, data can be transferred to noncontiguous blocks in the memory without the execution of an interrupt, unlike prior art computers as described above.

Like the interrupt service routine described in connection with the transfer of FILE 1, the interrupt service routine just described is performed each time the CPU recognizes a data channel request made by the I/O module 28 on behalf of UART2. The I/O module makes data channel requests until FILE 2 has been completely transferred to the memory 24 from UART0. The data channel requests are made at a rate determined for the most part by how fast UART2 can transmit a word of data to the circular buffer 64.

Figure 10C:
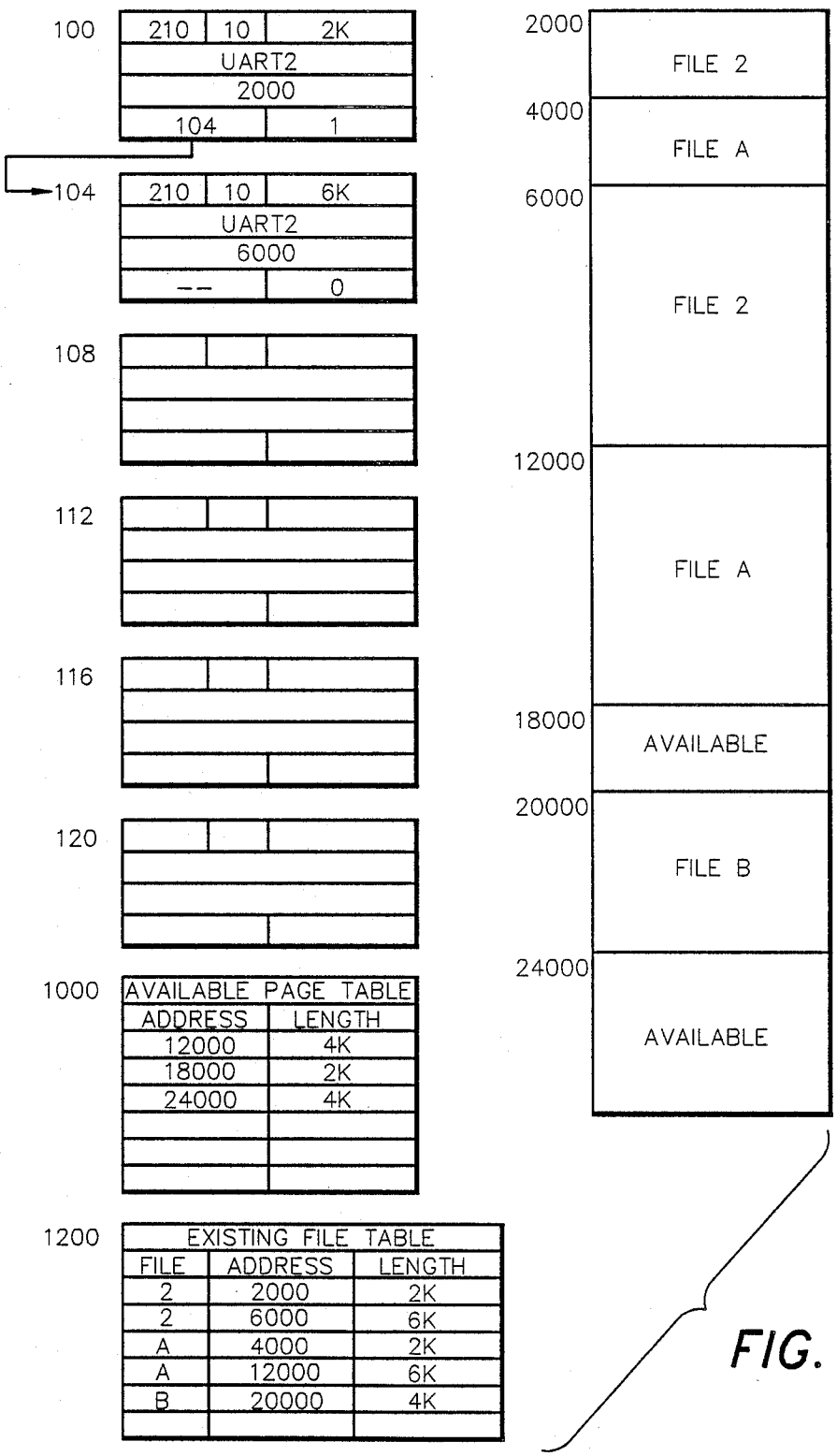
FIG. 10c shows a portion of the memory of the computer of FIG. 1 in a third state.

After FILE 2 has been transferred to the memory 24 from UART2, the state of the memory 24 is as shown in the righthand portion of FIG. 10c, and the available page table 150 and the existing file table 152 have been updated to reflect this new memory state.

While this invention has been described in connection with an I/O module connected to four cathode ray tubes, other I/O modules could be used and the benefits of the invention obtained. For example, printer interfaces could be used, multiplexers that handle many data communication lines could be used, etc. Furthermore, while various interface modules such as these are conventionally used in computer systems, the detailed description of a preferred embodiment has been made with respect to only one of these interface modules so as not to obscure the invention.

Modifications and alternative embodiments of the invention will be apparent to those skilled in the art in view of the foregoing description. Accordingly, this description is to be construed as illustrative only, and is for the purposes of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A processor-controlled, interruptdriven data communications system for a computer having a central processing unit and a memory for transferring data between the memory and a plurality of peripheral devices without requiring an interrupt context switch for each data transfer, said system comprising:
   a bus connecting said memory and said peripheral devices;
   a resident microcode within said central processing unit that controls the gate and register level operation of said central processing unit, said resident microcode including an input/output service routine;
   a plurality of register locations resident in said central processing unit dedicated to data communications; and
   an address generator that generates an address vector when data is transferred between said memory and a first one of said peripheral devices in response to a request from said first peripheral device, said address vector generated in response to vector data on said bus uniquely associated with said first peripheral device, said address vector comprising an address of one of said register locations, said register location including a pointer to a location in memory that stores data transferred between said memory and said first peripheral device and an address of said input/output service routine in said resident microcode, said resident microcode operating in response to said address from said register location to execute said input/output service routine and transfer data between said memory and said first peripheral device, said data transferred as blocks of data, said register location storing a data control block that includes a count that indicates a number of blocks of data to be transferred, a count of the amount of data remaining to be transferred in a block of data and a pointer to a data control block for a next block of data to be transferred, said resident microcode accessing said data control block to control the transfer of said blocks of data without requiring a context switch by said central processing unit while said blocks of data are being transferred, said address generator further responsive to requests from a second one of said peripheral devices to address a second register location that includes data to cause said resident microcode to interleave transfers of data between said memory and said second peripheral device with transfers of data between said memory and said first peripheral device, said resident microcode interleaving said transfers of data without requiring execution of instructions by said central processing unit when said interleaving occurs.

2. A data communications system for a computer as defined in claim 1, comprising at least 10 register locations resident in said central processing unit which are dedicated to data communications.

3. A data communications system for a computer as defined in claim 1, comprising at least 100 register locations resident in said central processing unit which are dedicated to data communications.

4. A data communications system for a computer for transferring data between the computer and a plurality of peripheral devices, comprising:
   a memory that stores data transferred from said peripheral devices to said computer and data transferred from said computer to said peripheral devices;
   a device storage location associated with said peripheral devices;
   a bus connecting said memory and said data storage location that transfers data between said memory and said data storage location;
   a resident microcode within said central processing unit that controls the gate and register level operation of said central processing unit, said resident microcode including an input/output service routine that operates said computer to transfer data between said memory and said peripheral devices via said bus and said data storage location;

a respective register location for each of said peripheral devices resident in said central processing unit dedicated to data communications; and an address generator that generates an address vector when a first one of said peripheral devices is ready for data to be transferred between said first peripheral device and said memory, said address vector comprising an address of said respective register location for said first peripheral device, said address vector generated in response to vector data on said bus uniquely associated with said first peripheral device that is ready for data to be transferred, said respective register location including a pointer to a memory location that stores data transferred between said memory and said first peripheral device and an address of said input/output service routine in said resident microcode, said data transferred as blocks of data, said register location storing a data control block that includes a count that indicates a number of blocks of data to be transferred, a count of the amount of data remaining to be transferred in a block of data and a pointer to a data control block for a next block of data to be transferred, said microcode responsive to said address of said input/output service routine to access said data control block and to transfer data between said memory and said first peripheral device in accordance with said counts and said pointer in said data control block without executing any instructions from said memory while said data is being transferred, said address generator generating address vectors in response to vector data from additional ones of said peripheral devices when said additional peripheral devices are ready for data to be transferred, said address vectors comprising addresses of respective register locations for said additional peripheral devices to cause said resident microcode to interleave data transfers to said first peripheral device with data transfers to said additional peripheral devices, said resident microcode interleaving said transfers of data without requiring execution of instructions by said central processing unit when said interleaving occurs.

5. A data communications system for a computer as defined in claim 4, wherein said register location comprises a plurality of registers.

6. A data communications system for a computer as defined in claim 4, wherein said respective register location for said first peripheral device comprises four registers that store parameters identifying a block of data to be transferred between said memory and said first peripheral device, and wherein:

a first of said four registers stores data representing said address of said input/output service routine in said resident microcode, a device address and a quantity of data to be transferred between said memory and said first peripheral device;

a second of said four registers stores data representing a source address of a location from which data is to be moved;

a third of said four registers stores data representing a destination address of a location to which said data is to be moved; and a fourth of said four registers stores a block count indicting the number of additional blocks of data to be transferred, and, when an additional block of data is to be transferred, stores a pointer to a memory location where data are stored that represent the parameters of said additional block of data.

7. A data communications system for a computer as defined in claim 6, wherein said source address specifies said pointer that points to said location within said memory from which data is transferred.

8. A method of data communications for transferring data between a memory in a computer, having a central processing unit controlled at the gate and register levels by microcode, and a plurality of peripheral devices without requiring an interrupt context switch, said method comprising the steps of:

storing a plurality of parameters that define data transfers for each of said peripheral devices in a respective register location in said central processing unit of said computer, said parameters including an address of an input/output service routine of said microcode, a pointer to a source of transferred data and a pointer to a destination for transferred data for each of said peripheral devices;

generating an address vector that contains an address of said register location associated with a first peripheral device ready to transfer data to or from said memory;

executing said input/output service routine of said microcode at said address stored in said register location for said first peripheral device, said input/output service routine using said pointers in said register location to control the transfer of data from a first data location specified by said source pointer stored in said register location to a second data location specified by said destination pointer stored in said register location, said input/output service routine updating at least one of said pointers so that data is transferred between said first peripheral device and said memory without executing any instructions by said central processing unit while transferring said data so that said central processing unit remains in a state in which it was prior to transferring said data, one of said first and second data locations being resident in the memory of the computer and the other of said first and second data locations being said first peripheral device; and interleaving transfers of data between said first peripheral device and said memory with transfers of data between a second of said peripheral devices and said memory, said interleaving occurring without requiring execution of instructions by said central processing unit.

9. A method of data communications as defined in claim 8, wherein said register location comprises a plurality of registers.

10. A method of data communications as defined in claim 9, wherein said register locations for said peripheral devices each comprises four registers, and wherein:

a first of said four registers stores data representing said address of said interrupt service routine in said microcode, a device address and a quantity of data to be transferred;

a second of said four registers stores a source address specifying one of said first and second data locations;

a third of said four registers stores a destination address specifying the other of said first and second data locations; and a fourth of said four registers stores a block count indicating the number of additional blocks of data to be transferred, and, when an additional block of data is to be transferred, stores a pointer to a memory locations where data are stored that represent the parameters of said additional block of data.

11. A processor-controlled data communications system for a computer, having a central processing unit and a memory, for transferring data between the memory and first and second peripheral devices without requiring an interrupt context switch, comprising:

a microcode for controlling the gate and register level operation of said central processing unit;

at least first and second noncontiguous blocks of data storage locations within said memory for storing first and second blocks of data transferred between said memory and said first peripheral device, and a third block of data storage locations within said memory for storing a block of data transferred between said memory and said second peripheral device;

a data storage location associated with said first and second peripheral devices;

a bus connecting said memory and said data storage location;

a register that includes a register storage location associated with each of said first and second peripheral devices, each said register storage location storing a pointer representing a location within said microcode that comprises an input/output service routine, said register storage location associated with said first peripheral device further storing data that represents the location of said first block of memory locations and that represents the amount of data to be transferred in a block between said first block of memory locations and said first peripheral device, said register location associated with said second peripheral device further storing data that represents the locations of said third block of memory locations and that represents the amount of data to be transferred between said third block of memory locations and said second peripheral device;

data transfer circuitry that controls the transfer of said first, second and third blocks of data between said memory and said data storage location, said data transfer circuitry causing said microcode to execute said input/output service routine at the location represented by said pointer in said first register location to transfer said blocks of data between said memory and said data storage location for said first peripheral device without requiring the execution of instructions by said central processing unit during said transfer, said input/output service routine in said microcode monitoring said pointers in said first register location and automatically switching from said first noncontiguous block of said memory to said second noncontiguous block of said memory when the first block of data has been transferred between said first block of said memory and said first peripheral device, said switching occurring without requiring an interrupt context switch, said microcode further interleaving transfers of data between said memory and said data storage location for second peripheral device with transfers of data between said memory and said data storage location for said first peripheral device, said microcode interleaving said transfers of data without requiring execution of instructions by said central processing unit when said interleaving occurs.

12. A data communications system for a computer as defined in claim 11, wherein data is transferred from said noncontiguous blocks of memory to said data storage location.

13. A data communications system for a computer as defined in claim 11, wherein said memory further includes storage for at least first and second data channel control blocks, said first data channel control block being transferred to said register prior to the transfer of said first block of data, the contents of said register being updated from said second data channel control block in order to switch the data transfer from said first block of data to said second block of data.

14. A data communications system for a computer as defined in claim 13, wherein said register location associated with said first peripheral device contains an address of one of said first and second data channel control blocks in said memory.

15. A data communications system for a computer as defined in claim 14, wherein said register stores said pointers in a predetermined data format, and wherein said first and second data channel control blocks have the same predetermined data format as said register.

16. A data communications system for a computer defined in claim 11, wherein each of said noncontiguous blocks of memory comprises at least one memory page.

17. A data communications system for a computer as defined in claim 16, wherein each memory page comprises at least 2000 words of memory.

18. A method of data communications in which data is transferred between first and second noncontiguous blocks in a memory of a computer and a first peripheral device and data is transferred between a third block in said memory and a second peripheral device without requiring an interrupt context switch when a data transfer is switched from one of the noncontiguous blocks to another of the noncontiguous blocks and when data transfer is switched to said third block, said method comprising the steps of:

initiating data transfers between said first peripheral device and said first block of said memory of said computer, said data transfer being made under the control of a resident microcode in a central processing unit of said computer, said microcode controlling the gate and register level operation of said central processing unit, said microcode accessing a register in said central processing unit to obtain pointers to the source and destination of said data transfer and to obtain a count representing a quantity of data to transfer between said first block of said memory and said first peripheral device, one of said pointers representing a location in said first block of said memory, said microcode updating said counts as said data is transferred;

after transferring said quantity of data between said first block of said memory and said first peripheral device, retrieving a block of control data from said memory and storing said block of control data in said register to replace said pointers and said count, said retrieving and storing of said block of control data being controlled by said microcode and occurring without the execution of a context switch by said central processing unit, said block of control data including a pointer representing a location in a second block of said memory;

continuing said data transfer between said peripheral device and said second block of the memory of the computer, said second block of said memory being noncontiguous with said first block of said memory; and while transferring data between at least one of said first and second blocks of memory and said first peripheral device, interleaving data transfers between said third block of said memory and said second peripheral device, said interleaving occurring without requiring execution of instructions by said central processing unit.

19. A method of data communications as defined in claim 18, wherein said first and second portions of said memory each comprise at least one page of memory.

20. A method of data communications as defined in claim 19, wherein each of said pages of memory comprises at least 2000 words of memory.

21. A computer system having a data communications channel for transferring data between said computer system and a plurality of peripheral devices, said computer system comprising:

a memory that stores input/output data transferred to and from said computer system;

a data bus connected to said memory to provide a data transfer path to and from said memory;

at least one input/output control module connected to said data bus that transfers data between said data bus and said peripheral devices;

a central processing unit, said central processing unit comprising:

resident microcode that controls the gate and register level operation of said central processing unit, said resident microcode including at least one microcoded input/output service routine; and at least one special purpose register dedicated to data communications between said computer system and said peripheral devices, said special purpose register including for each one of said plurality of peripheral devices:

a first data storage location that stores a first address pointer associated with said each one peripheral device that points to a microcoded input/output service routine in said resident microcode associated with said each one peripheral device;

a second data storage location that stores a second address pointer that points to a location in said memory that stores the input/output data transferred between said computer system and said each one peripheral device; and a counter that indicates the amount of data remaining to be transferred between said computer system and said each one peripheral device;

and control logic within said input/output control module that sends a signal to said central processing unit when data is ready to be transferred between said memory and a first one of said peripheral devices associated with said control module, said special purpose register responsive to said signal to provide said first address pointer to said resident microcode to cause said microcode associated with said first peripheral device to initiate said input/output service routine, said resident microcode updating said second address pointer and said counter from said special purpose register while executing said input/output service routine to select said location in said memory where said input/output data is stored, said resident microcode causing said input/output data to be transferred between said location in said memory and said input/output module via said bus and updating said second address pointer and said counter without requiring the execution of instructions by said central processing unit during the transfer of said data, said special purpose register further responsive to a signal when data is ready to be transferred between said memory and a second one of said peripheral devices, said special purpose register responsive to said signal to provide said first address pointer associated with said second peripheral device to said resident microcode to cause said microcode to initiate an input/output service routine associated with said second peripheral device while continuing to transfer data between said memory and said first peripheral device, said resident microcode updating said second address pointer and said counter associated with said second peripheral device from said special purpose register while executing said input/output service routine to select said location in said memory where said input/output data for said second peripheral device is stored, said resident microcode causing said input/output data to be transferred between said location in said memory and said second peripheral device via said bus and updating said second address pointer and said counter associated with said second peripheral device without requiring the execution of instructions by said central processing unit during the transfer of said data to said second peripheral device.

* * * * *